(12) United States Patent
Kida et al.

(10) Patent No.: US 6,335,728 B1
(45) Date of Patent: Jan. 1, 2002

(54) DISPLAY PANEL DRIVING APPARATUS

(75) Inventors: Hiroshi Kida; Masanori Hoshikawa, both of Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/274,476

(22) Filed: Mar. 23, 1999

(30) Foreign Application Priority Data

Mar. 31, 1998 (JP) ............................................. 10-084803
Mar. 31, 1998 (JP) ............................................. 10-084804
Apr. 16, 1998 (JP) ............................................. 10-106369

(51) Int. Cl.[7] ................................................ H04N 5/45
(52) U.S. Cl. ......................... 345/204; 345/37; 345/55; 348/564; 348/567; 315/169.4
(58) Field of Search ........................... 345/37, 55, 204; 348/564, 567; 315/169.4

(56) References Cited

U.S. PATENT DOCUMENTS

| | | | | |
|---|---|---|---|---|
| 4,796,089 A | * | 1/1989 | Imai et al. ................... | 358/183 |
| 5,040,067 A | * | 8/1991 | Yamazaki .................... | 348/588 |
| 5,047,858 A | * | 9/1991 | Aimonoya ................... | 348/218 |
| 5,504,535 A | * | 4/1996 | Abe ............................. | 348/565 |
| 5,606,612 A | * | 2/1997 | Griffin et al. ................ | 380/14 |
| 5,729,300 A | * | 3/1998 | Ahn ............................. | 348/564 |
| 5,831,673 A | * | 11/1998 | Przyborski et al. ......... | 348/239 |
| 5,854,540 A | * | 12/1998 | Matsumoto et al. ....... | 315/169.1 |
| 5,889,562 A | * | 3/1999 | Pau ............................. | 348/447 |
| 6,081,303 A | * | 1/2000 | Kim ............................ | 348/797 |

\* cited by examiner

*Primary Examiner*—Bipin Shalwala
*Assistant Examiner*—Vincent E. Kovalick
(74) *Attorney, Agent, or Firm*—Sughrue Mion, PLLC

(57) ABSTRACT

An apparatus for driving a display panel comprises a receiving circuit of a TV broadcasting wave. The writing and reading operations of the pixel data to/from the memory are performed synchronously with the self-advancing clock signal, thereby preventing a disturbance of a display image upon channel switching. The display driving apparatus according to another aspect of the invention has two frame memories to alternately store pixel data and a memory control apparatus to control the writing and reading operations to/from the frame memories which makes a scanning line interpolation processing apparatus constructed by a memory, an arithmetic operating circuit, and the like unnecessary. Furthermore, the driving apparatus can be altered to allocate storage in a memory for pixels which are to be displayed in one picture plane. This storage allocation allows a motion image and the still image to be simultaneously displayed.

4 Claims, 14 Drawing Sheets

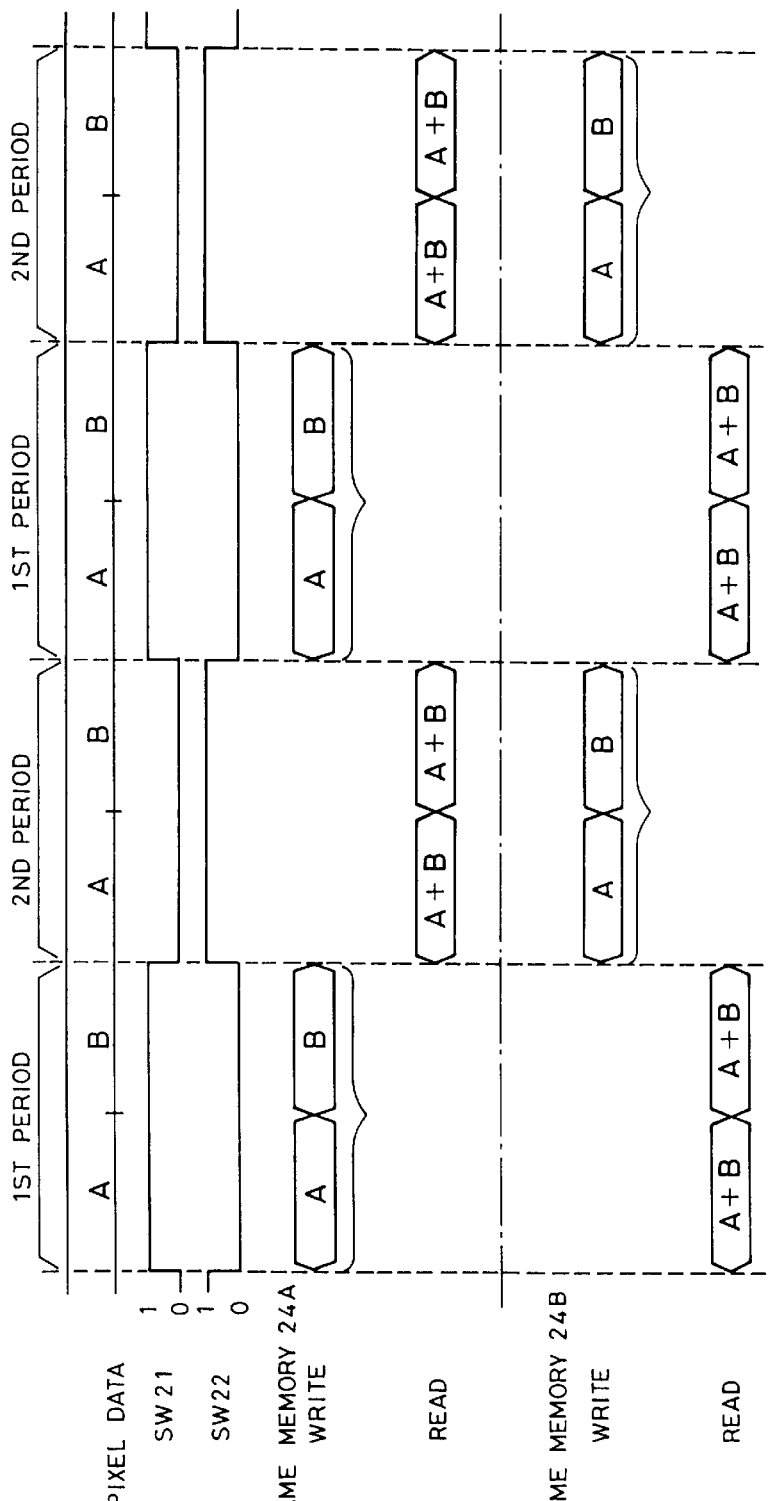

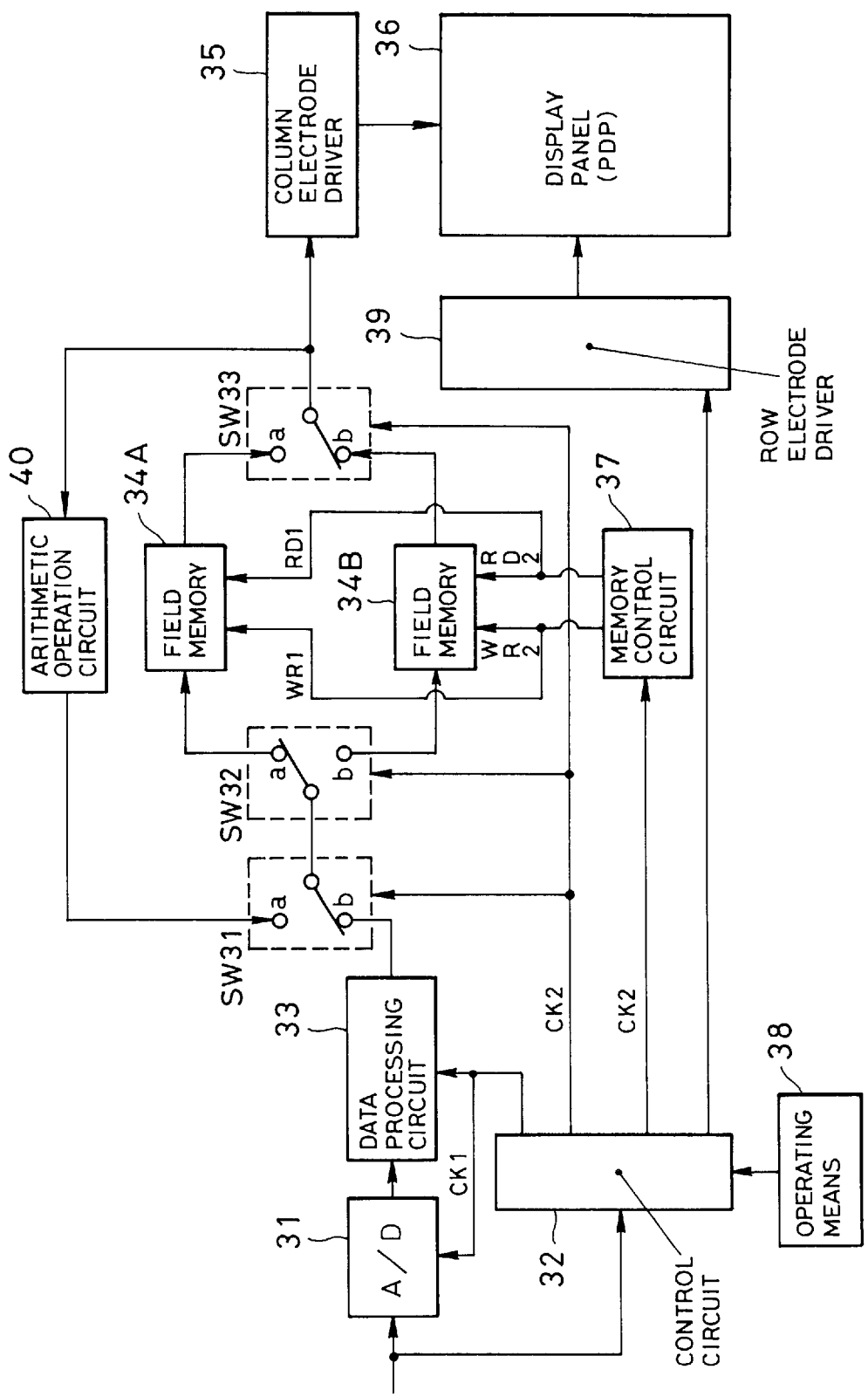

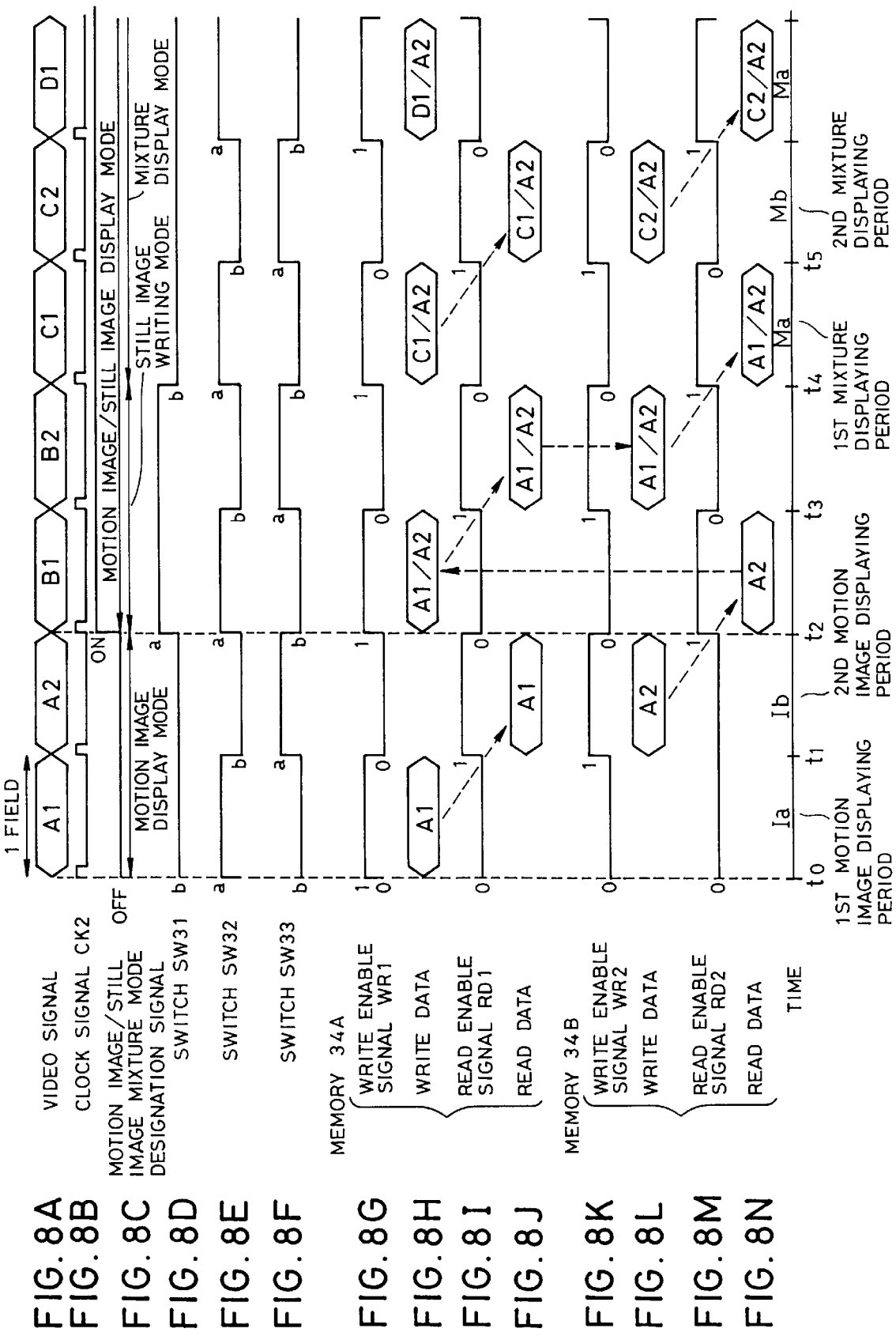

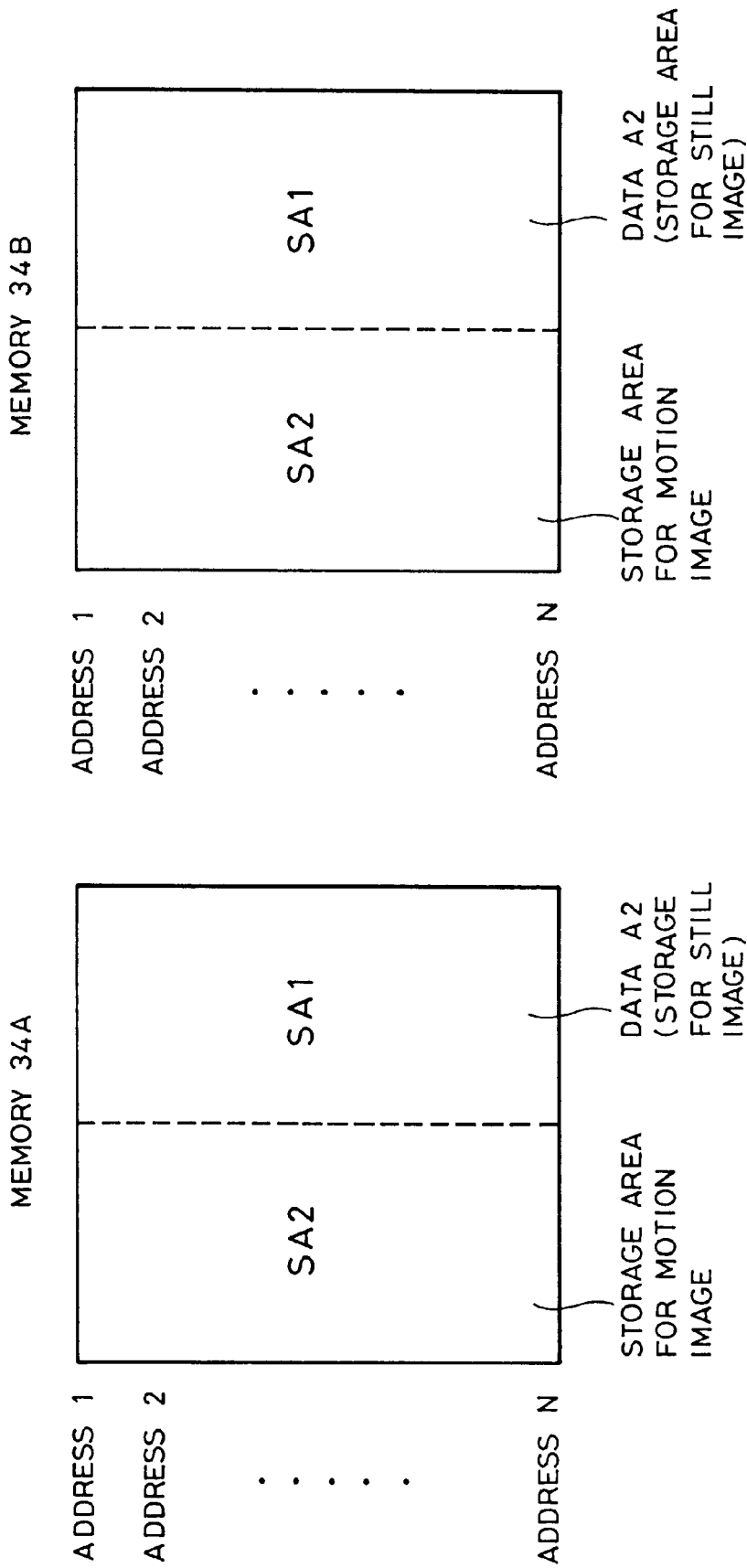

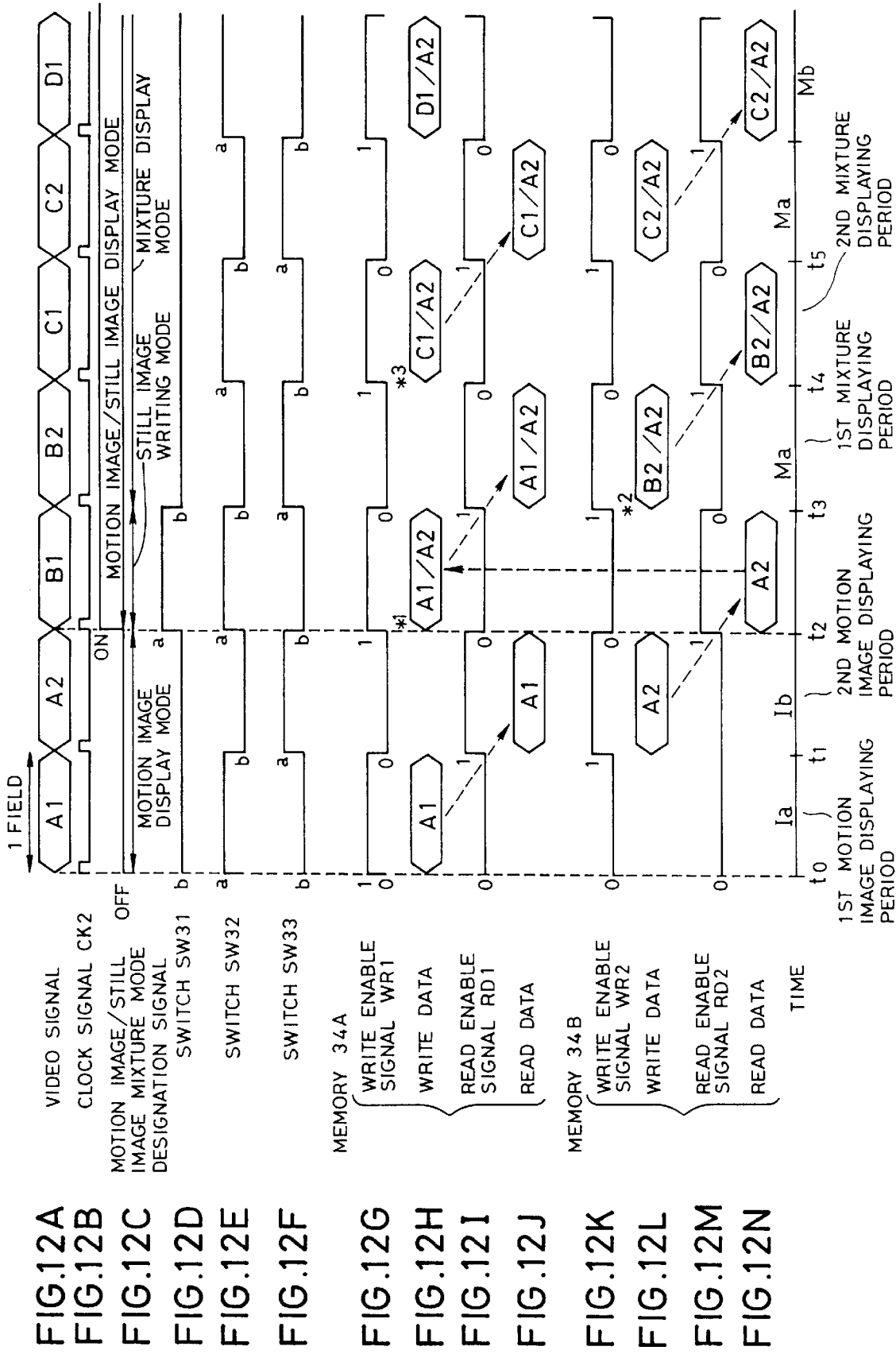

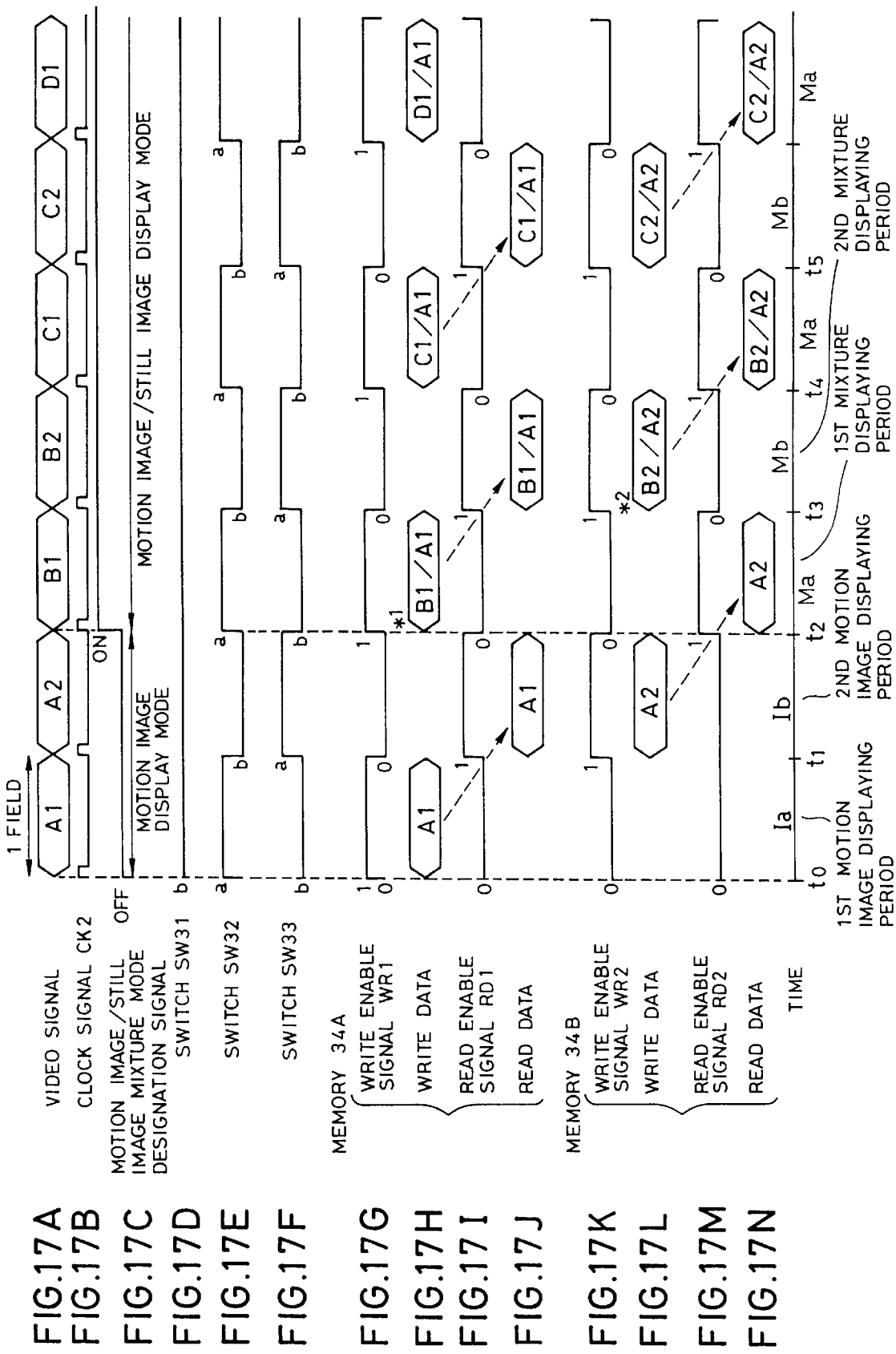

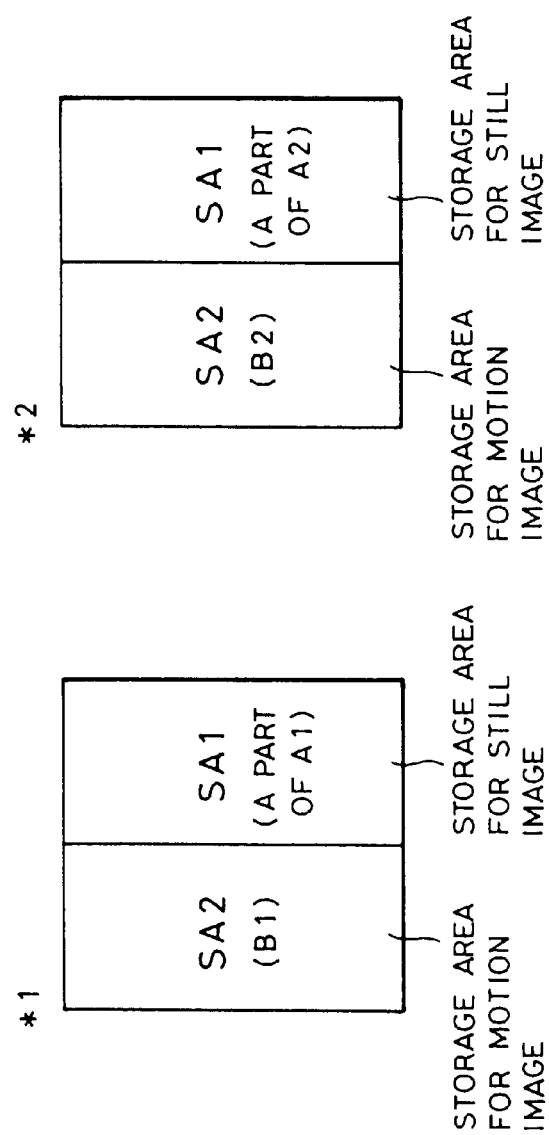

DISPLAY PANEL DRIVING APPARATUS

BACKGROUND OF THE INVENTION

1. Field of the Invention

The present invention relates to an apparatus for driving a display panel such as a plasma display panel (PDP) or the like.

2. Description of Related Art

In a display apparatus of a matrix display system such as a PDP or the like, it is general to use two field memories as memories for display and the following operations are repeated to perform a halftone display by using a subfield method. That is, while display is performed based on pixel data of one field read out from one of the two memories, pixel data of the next one field is written into the other memory. After completion of the reading of the pixel data from one of the memories, the pixel data is read out from the other memory and is displayed and, simultaneously, the next pixel data is written into the one memory. That is, the display is performed by switching the memory on the reading side and the memory on the writing side every field.

As disclosed in Japanese Patent Kokoku No. 7-48834, a channel guiding function for automatically changing channels and displaying images of a plurality of broadcasting stations onto one picture plane, thereby facilitating the channel selection is adopted in a TV receiver or the like.

In a plasma display apparatus of a matrix display system, various pulses necessary for light emission display are generated by using a sync signal of a video signal as a reference and an image is displayed. In the case of displaying a plurality of images into one picture plane by sequentially switching a plurality of channels in a short time for a station selection of the channel guiding function or the like, when a generation timing of the sync signal is variable every channel, it is necessary to match the generation timings of various pulses for image display to the sync signal of the video signal within a short time. When the generation timings of the various pulses are deviated from the sync signal even slightly, a problem such that the picture quality of the image that is displayed on the picture plane deteriorate occurs.

In a display apparatus of a matrix display system such as a PDP or the like, in the case of displaying an image on the basis of a video signal generated by an interlaced scanning such as NTSC system, HDTV system or the like, in order to compensate a low light emission luminance, by also allocating pixel data corresponding to the odd rows (even rows) of the picture plane as they are to the even rows (odd rows), the data is interpolated, or by converting the pixel data to the pixel data of the progressive scan by a scanning line interpolating process, a display is performed by the progressive scan.

The former method, however, has a problem that a resolution in the vertical direction is not preferable. The latter method has a problem such that a memory, an arithmetic operating circuit, and the like have to be used and costs become high as a whole.

It is necessary to switch the memory on the reading side and the memory on the writing side every field in order to display a motion image. It is, however, necessary to stop the switching in order to display a still image. In order to simultaneously display both of a motion image and a still image on a picture plane, in addition to the memories, another memory for processing multi-picture planes and its control circuit are necessary, so that there is a problem such that the price becomes high as a whole.

OBJECTS AND SUMMARY OF THE INVENTION

It is an object of the invention to provide a driving apparatus of a display panel in which a disturbance does not occur in a display image on a picture plane even at the time of selecting a channel in order to solve the problems.

It is another object of the invention to provide a driving apparatus of a display panel which can reduce costs by making a scanning line interpolation processing apparatus constructed by a memory, an arithmetic operating circuit, and the like unnecessary and which can improve a resolution in the vertical direction in order to solve the problems.

It is further another object of the invention to provide a cheap driving apparatus of a display panel which can solve the problems and can simultaneously display a motion image and a still image while suppressing an increase in memory capacity.

According to a first aspect of the invention, there is provided a driving apparatus of a display panel, comprising: a television signal receiving circuit for receiving a television broadcasting wave, generating a video signal, and enabling a receiving station to be changed in accordance with an instruction; a sync signal separating circuit for detecting a sync signal from the video signal; an A/D converter for obtaining corresponding pixel data every pixel by sampling the video signal; first and second memories each having a capacity to store at least pixel data of one field; self-advancing clock signal generating means for generating a self-advancing clock signal; control means for controlling the first and second memories so as to alternately write the pixel data of one field into the first and second memories and alternately read the written pixel data of one field from the first and second memories; and display driving means for driving the display panel on the basis of the pixel data which is read out from the first and second memories, wherein the control means switches the writing and reading operations of each of the memories synchronously with the self-advancing clock signal each time that is twice or more as long as a generating period of the self-advancing clock signal and writes the pixel data of one field into the memory in response to the sync signal which is detected just after the memory was switched from the reading to the writing, and the control means reads out the pixel data written synchronously with the self-advancing clock signal and supplies it to the display driving means.

According to a second aspect of the invention, there is provided a driving apparatus of a display panel, comprising: an A/D converter for obtaining corresponding pixel data every pixel by sampling a video signal generated by an interlaced scanning; first and second frame memories for storing the pixel data; memory control means for alternately writing the pixel data into each of the frame memories and, when the pixel data of one frame is written into one of the frame memories, for reading out the written pixel data of one frame from the other frame memory; and display driving means for driving the display panel by a progressive scan on the basis of the pixel data which is read out from the first and second frame memories, wherein the memory control means stores an odd row field constructed by the pixel data corresponding to odd number designated scanning lines of the display panel into a corresponding address in the frame memory, stores an even row field which is supplied to the frame memory subsequently to the odd row field and is constructed by pixel data corresponding to even number designated scanning lines in the display panel to a remaining corresponding address in the frame memory, reads out the stored pixel data as pixel data of the progressive scan, and supplies it to the display driving means.

According to a third aspect of the invention, there is provided a driving apparatus of a display panel, comprising: an A/D converter for obtaining corresponding pixel data every pixel by sampling a video signal; first and second memories for storing the pixel data; memory control means for controlling writing and reading operations of the first and second memories so as to alternately write the pixel data into the first and second memories and alternately read out the written pixel data from the first and second memories; and display driving means for driving the display panel on the basis of the pixel data which is read out from the first and second memories, wherein each of the first and second memories has a plurality of storage areas which are allocated every plurality of pixels which are displayed in one picture plane, and the memory control means rewrites the pixel data in a predetermined storage area among the plurality of storage areas in the first and second memories.

BRIEF DESCRIPTION OF THE DRAWINGS

FIGS. 6A to 6G are diagrams for explaining the second embodiment showing the relation between the writing and reading operations of pixel data and frame memories;

FIG. 7 is a diagram showing the construction of the first embodiment of a driving apparatus of a PDP according to the invention;

FIGS. 8A to 8N are diagrams for explaining the operation of the driving apparatus of the PDP of FIG. 7;

FIGS. 9 and 10 are diagrams for explaining states of memories of the driving apparatus of FIG. 1;

FIGS. 12A to 12N are diagrams for explaining the operation of the driving apparatus of the PDP of FIG. 11;

FIGS. 17A to 17N are diagrams for explaining the further operation of the driving apparatus of the PDP of FIG. 11; and FIGS. 18 to 20 are diagrams for explaining states of memories when the driving apparatus of FIG. 11 is operated as shown in FIGS. 17A to 17N.

DETAILED DESCRIPTION OF THE PREFERRED EMBODIMENTS

A driving apparatus of a plasma display panel of an embodiment of the invention will be described hereinbelow with reference to the drawings.

Figure 1:
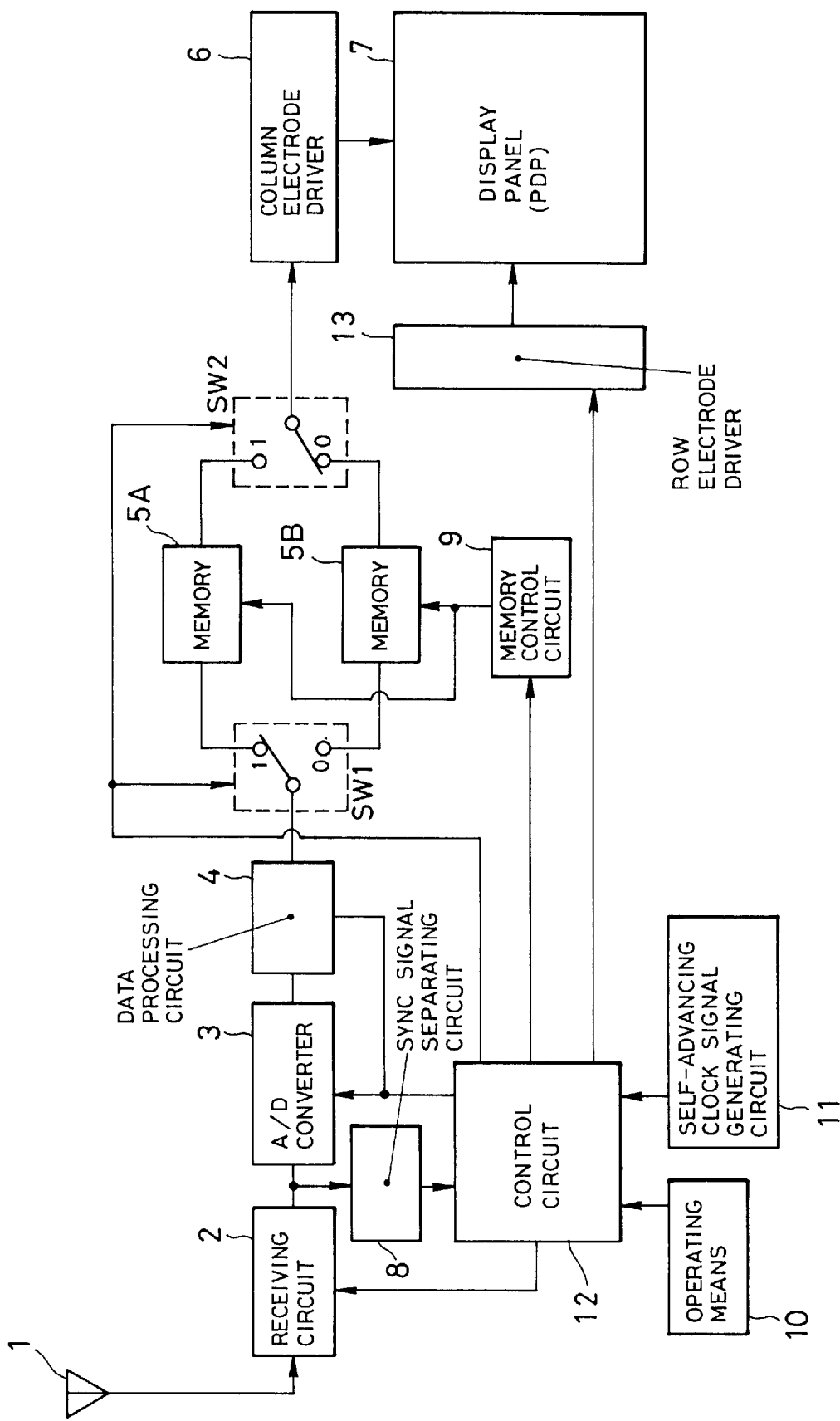
FIG. 1 is a diagram showing the construction of an example of a display panel driving apparatus according to the invention.

FIG. 1 is a diagram showing the construction of the driving apparatus of the plasma display panel of an embodiment of the invention. In FIG. 1, reference numeral 1 denotes an antenna for receiving a radio wave signal of a television broadcasting. A television signal receiving circuit 2 demodulates a signal of a broadcasting station designated by the radio wave signal received by the antenna 1 and generates it as a video signal. An A/D converter 3 samples the video signal which is supplied from the receiving circuit 2 and analog-digital converts it to a digital video signal, thereby obtaining pixel data D of every pixel. An image data processing circuit 4 performs an image process to the pixel data supplied from the A/D converter and is constructed by, for example, a false outline processing circuit to realize a pseudo intermediate display by decreasing the number of bits of the pixel data and to generate pixel data in which a false outline is compensated. A switch SW1 is connected to the image data processing circuit 4. The switch SW1 selectively connects the image data processing circuit 4 to a memory 5A or 5B.

Each of the memories 5A and 5B has a storage capacity which can store pixel data of at least one field. A column electrode driver 6 is connected to the memories 5A and 5B via a switch SW2, separates the pixel data of one field, every bit, which is read out from the memories 5A and 5B, generates a pixel data pulse having a voltage value corresponding to a logical value "1" or "0" of the bit, and applies the pixel data pulse to a column electrode of a plasma display panel (PDP) 7.

A sync signal separating circuit 8 detects a sync signal from the video signal that is generated from the television signal receiving circuit 2. A memory control circuit 9 controls the writing and reading operations of the pixel data to/from the memories 5A and 5B. Operating means 10 sets or resets a multi-screen mode in which the picture plane is divided into a plurality of pictures.

A self-advancing clock signal generating circuit 11 generates a self-advancing clock signal having the same frequency as that of the sync signal of the video signal and having no correlation with the generation timing of the synch signal of the video signal.

A control circuit 12 includes the memory control circuit 9 and is connected to the receiving circuit 2, A/D converter 3, image data processing circuit 4, switches SW1 and SW2, sync signal separating circuit 8, operating means 10, and self-advancing clock signal generating circuit 11. The control circuit 12 supplies a clock signal when a data process is executed on the basis of the synch signal of the video signal detected by the sync signal separating circuit 8 to the receiving circuit 2, A/D converter 3, and image data processing circuit 4. The control circuit 12 controls the switches SW1 and SW2 and memory control circuit 9 by the self-advancing clock signal which is supplied from the self-advancing clock signal generating circuit 11. The control circuit 12 generates a reset timing signal, a scan timing signal, a maintaining timing signal, and an erasure timing signal which are necessary for image display on the basis of the supplied self-advancing clock signal and supplies them to a row electrode driver 13.

The row electrode driver 13 generates a reset pulse for initializing a residual charge amount, a scan pulse for writing pixel data, a maintaining pulse for maintaining a discharge light emission state, and an erasure pulse for stopping the discharge light emission in response to those various timing signals and applies the pulses to a pair of row electrodes of the PDP 7. In this case, the scan pulse is applied to the row electrode pair by the progressive scan.

When the scan pulse is applied from the row electrode driver 13 to the PDP 7 in a period during which a pixel data pulse is supplied from the column electrode driver 6, charges corresponding to the supplied pixel data pulse are accumulated in the PDP 7. At this moment, light is emitted in an intersecting portion between a column electrode to which the pixel data pulse corresponding to, for example, the logic "1" has been applied and the row electrode pair to which the scan pulse has been applied. The intersecting portion corresponds to each pixel on the picture plane of the PDP 7. After that, when the maintaining pulse is applied from the row electrode driver 13, the light emitting state is maintained only for a time corresponding to the number of maintaining pulses applied.

An embodiment of the operation of the driving apparatus will now be described with reference to FIGS. 2A to 2K.

FIGS. 2A to 2K are diagrams showing the writing and reading operations of data to/from the memories 5A and 5B and pixel data which is displayed on the PDP 7.

The control circuit 12 supplies a self-advancing clock C which is received from the self-advancing clock signal generating circuit 11 to the switches SW1 and S2 and memory control circuit 9. Each of the switches SW1 and SW2 is alternately switched between a contact "0" and a contact "1", for example, every two periods of the self-advancing clock C. When the data processing circuit 4 is connected to the memory 5A via the contact "1" of the switch SW1, the memory 5B is connected to the column electrode driver 6 via the contact "0" of the switch SW2. When the data processing circuit 4 is connected to the memory 5B via the contact "0" of the switch SW1, the memory 5A is connected to the column electrode driver 6 via the contact "1" of the switch SW2.

As mentioned above, the memory control circuit 9 alternately sets a writing mode and a reading mode of each of the memories 5A and 5B every two periods of the self-advancing clock. When the memory 5A is connected to the data processing circuit 4 via the contact "1" of the switch SW1, the writing mode is set. When the memory 5B is connected to the column electrode driver 6 via the contact "0" of the switch SW2, the reading mode is set. On the contrary, when the memory 5A is connected to the column electrode driver 6 via the contact "1" of the switch SW2, the reading mode is set. When the memory 5B is connected to the data processing circuit 4 via the contact "0" of the switch SW1, the writing mode is set. FIGS. 2D to 2G show connecting states of the switches SW1 and SW2 and the writing mode and reading mode of the memories 5A and 5B.

The writing operation of data to each of the memories 5A and 5B when the mode is set as mentioned above will be described with reference to FIGS. 2A to 2G.

Figure 2:
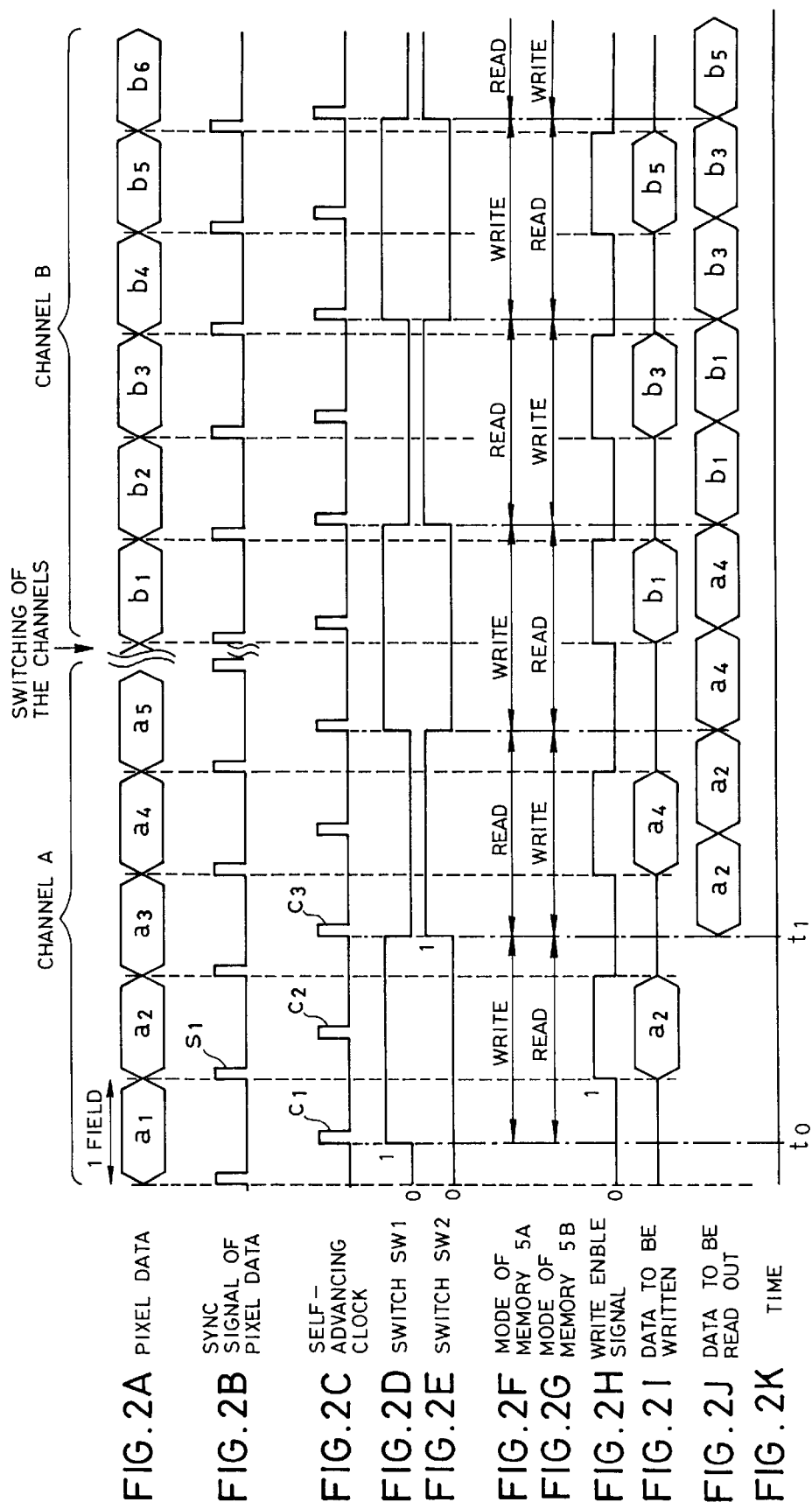
FIGS. 2A to 2K are waveform diagrams for explaining the operation of the driving apparatus.

The video signal sampled by the A/D converter 3 becomes pixel data (a) of every pixel, is sent to the image data processing circuit 4, is subjected to a false outline process or the like, and is written into the memories 5A and 5B. The sync signal of every field is detected by the sync signal separating circuit 8 from the video signal sampled by the A/D converter 3 (FIG. 2B).

The control circuit 12 supplies the self-advancing clock signal C (FIG. 2C) to each of the switches SW1 and SW2 and memory control circuit 9. When the image data processing circuit 4 is connected to the memory 5A and the writing mode is set by a self-advancing clock C1 at time $t_0$, the memory control circuit 9 generates a write enable signal (FIG. 2F) to the memory 5A in response to a sync signal $S_1$ of the video signal which is detected just after the generation of the self-advancing clock C1, so that pixel data $a_2$ of one field corresponding to the detected sync signal $S_1$ of the video signal is written into the memory 5A as shown in FIG. 2I.

The memory control circuit 9 controls an address in the memory 5A in response to the self-advancing clock C1 and sends a timing to sample the written input pixel data to the data processing circuit 4, thereby enabling the pixel data which is supplied to a small picture plane to be written as a reduced image when the television picture plane is divided into a plurality of pictures.

When the memory 5A is in the writing mode of the pixel data, the memory 5B is in the reading mode of the pixel data.

The reading operation of data from the memory 5A will now be described.

When a self-advancing clock C3 is generated at time $t_1$, the image data processing circuit 4 is connected to the memory 5B, and the memory 5A is connected to the column electrode driver 6 and enters the reading mode. In the reading mode of the memory 5A, the memory control circuit 9 generates a read address to the memory 5A. The data read out from the memory 5A is the pixel data $a_2$ of one field written in the writing mode just before, is sequentially read out in accordance with the self-advancing clock C3, and is supplied as pixel drive data. In the embodiment, since two self-advancing clocks C3 and C4 are generated in the reading mode, the pixel data $a_2$ is read out successively twice in the reading mode.

When the memory 5A is in the reading mode of the pixel data, the memory 5B is in the writing mode of the next pixel data. Pixel data $a_4$ is written into the memory 5A in a manner similar to the case of the memory 5A.

As mentioned above, the two memories alternately enter the writing mode and reading mode in response to the self-advancing clock signal. The pixel data of one field is alternately written and read to/from the two memories 5A and 5B until the channel is changed.

When the receiving channel is switched from a channel A to a channel B, although the phase of the sync signal of the video signal for the self-advancing clock signal is changed, the writing and reading operations of the pixel data to/from the memories 5A and 5B are continuously executed in accordance with the self-advancing clock signal C without interruption. That is, since the self-advancing clock as a reference pulse for writing and reading the pixel data is supplied at a predetermined interval also at the moment of the channel switching and the pixel data is written and read out, a disturbance of an image that is displayed at the time of the channel switching in the picture place is prevented.

Although the switches SW1 and SW2 are switched every two periods of the self-advancing clock in the embodiment, they can be also switched every three periods of the self-advancing clock. The switches SW1 and SW2 can be also switched in a manner such that the memory 5A is set to the writing mode and the memory 5B is set to the reading mode in the successive two periods of the self-advancing clock, and that the memory 5A is set to the reading mode and the memory 5B is set to the writing mode in the following successive three periods.

The second embodiment of the invention will be described hereinbelow with reference to FIG. 3 and subsequent drawings.

Figure 3:
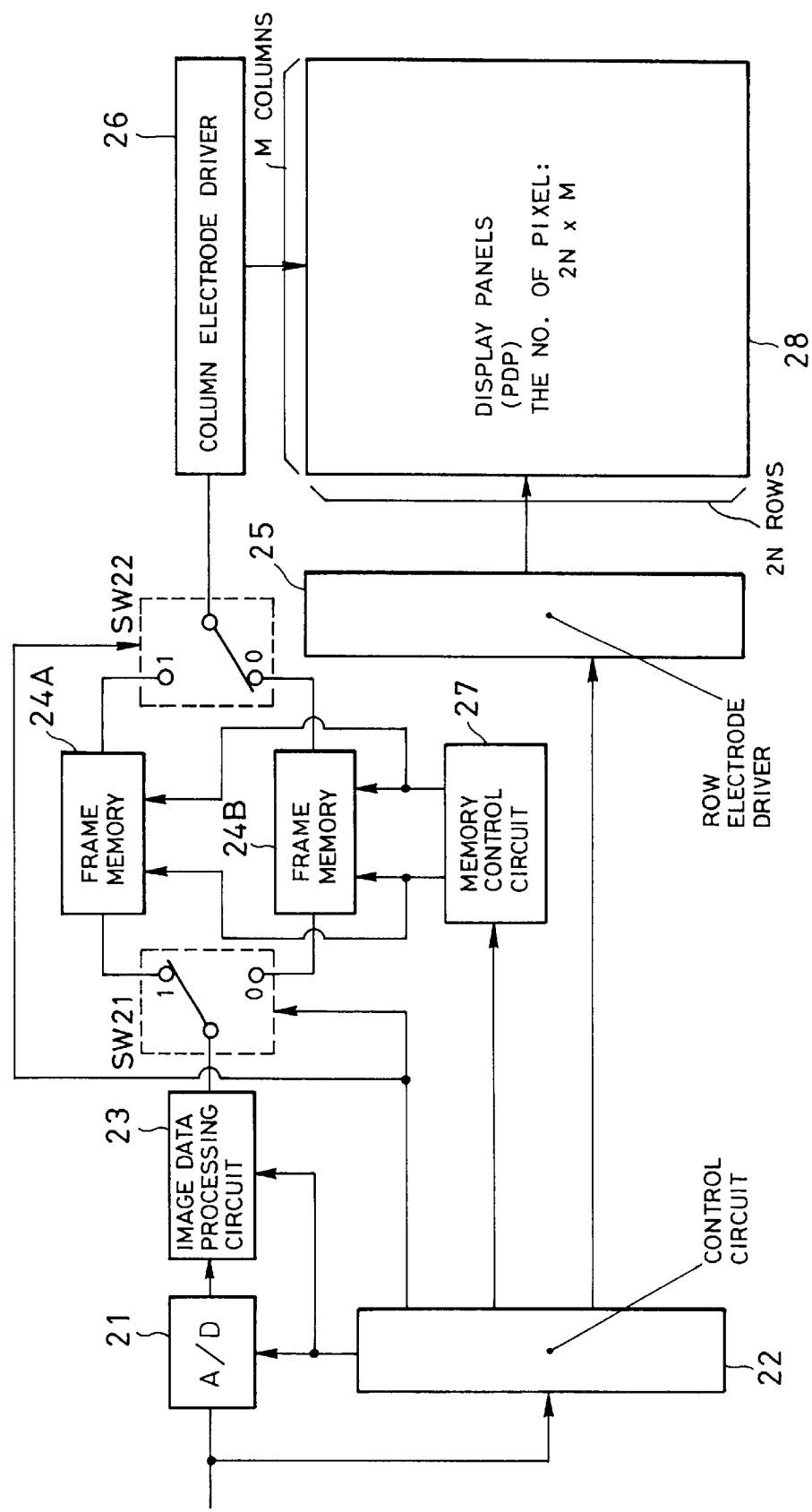
FIG. 3 is a diagram showing the construction of an embodiment of a plasma display driving apparatus according to the invention.

FIG. 3 is a diagram showing a schematic construction of a plasma display apparatus having a driving apparatus according to the invention.

In FIG. 3, an A/D converter 21 samples a supplied video signal at a predetermined clock frequency in accordance with a clock signal CK1 having a predetermined frequency which is supplied from a control circuit 22, thereby obtaining pixel data D of every pixel and sequentially supplying it to an image data processing circuit 23.

The image data processing circuit 23 is constructed by, for example, a false outline processing circuit for performing a data process in accordance with a clock signal CK2 having a predetermined frequency $f_2$ which is supplied from the control circuit 22. For example, the image data processing circuit 23 realizes a pseudo intermediate display by decreasing the number of bits of pixel data, generates pixel data in which a false outline is compensated, and alternately supplies the pixel data to frame memories 24A and 24B via the switch SW1.

A switch SW21 is provided between the frame memories 24A and 24B and the image data processing circuit 23 and alternately connects the frame memories 24A and 24B to the image data processing circuit 23 every timing of a clock signal CK3 having a predetermined frequency corresponding to one frame that is supplied from the control circuit 22.

A switch SW22 is provided between the frame memories 24A and 24B and a column electrode driver 26, is switched every timing of the clock signal CK3 that is supplied from the control circuit 22, and alternately connects the frame memories 24A and 24B to the column electrode driver 26.

The switching of the switches SW21 and SW22 is controlled by the control circuit 22 as follows. That is, for instance, when the switch SW21 connects the image data processing circuit 23 to the frame memory 24A (the switch contact is set to "1") at a timing of the clock signal CK3, the switch SW22 connects the frame memory 24B to the column electrode driver 26 (the switch contact is set to "0"). When the switch SW21 connects the image data processing circuit 23 to the frame memory 24B (the switch contact is set to "0"), the switch SW22 connects the frame memory 24A to the column electrode driver 26 (the switch contact is set to "1").

An output of a memory control circuit 27 is supplied to the frame memories 24A and 24B.

The memory control circuit 27 controls the writing and reading operations in the frame memories 24A and 24B of the pixel data which is supplied from the image data processing circuit 23 in accordance with an output signal from the control circuit 22 as will be explained in detail later.

The pixel data which is generated from the image data processing circuit 23 is sequentially written into each of the frame memories 24A and 24B at every timing of the clock signal CK2 that is supplied from the memory control circuit 27. The pixel data written in the frame memories 24A and 24B is transmitted to the column electrode driver 26 as pixel drive data every timing of the clock signal CK2 and drives the panel by the progressive scan.

The control circuit 22 generates the above clock signal, generates a reset timing signal, a scan timing signal, a maintaining timing signal, and an erasure timing signal in accordance with horizontal and vertical sync signals of the supplied video signal, and transmits them to a row electrode driver 25, respectively.

In response to those various timing signals, the row electrode driver 25 generates a reset pulse to initialize a residual charge amount, a scan pulse to write the pixel data, a maintaining pulse to maintain a discharge light emitting state, and an erasure pulse to stop the discharge light emission and transmits them to a pair of row electrodes of a PDP (plasma display panel) 28 in which the number of pixels is equal to (2N×M) (N and M are natural numbers). In this instance, the scan pulse is applied to the row electrode pair by the progressive scan.

The column electrode driver 26 separates pixel drive data of one frame, every bit, that is read out from the frame memories 24A and 24B, generates a pixel data pulse having a voltage value corresponding to each of the logical values "1" and "0" of the bit, and supplies it to column electrodes of the PDP 28.

When the scan pulse is applied from the row electrode driver 25 to the PDP 28 for a period of time during which the pixel data pulse is supplied from the column electrode driver, charges corresponding to the applied pixel data pulse are accumulated in the PDP 28. In this instance, light is emitted in an intersecting portion of the column electrode to which the pixel data pulse corresponding to, for example, the logic "1" has been applied and the row electrode pair to which the scan pulse has been applied. The intersecting portion corresponds to each pixel on the picture plane of the PDP 28. After that, when the maintaining pulse is supplied from the row electrode driver 25, the light emitting state is maintained only for the time corresponding to the number of maintaining pulses applied.

The operation of the driving apparatus will now be described with reference to FIGS. 4A to 4G and 5.

First, the video signal generated by the interlaced scanning and supplied is sampled by the A/D converter 21 and becomes pixel data of every pixel. The pixel data is subsequently sent to the image data processing circuit 23 and is subjected to an image process such as a false outline process or the like by the image data processing circuit 23. The processed data is sent to the frame memories 24A and 24B.

Figure 4:
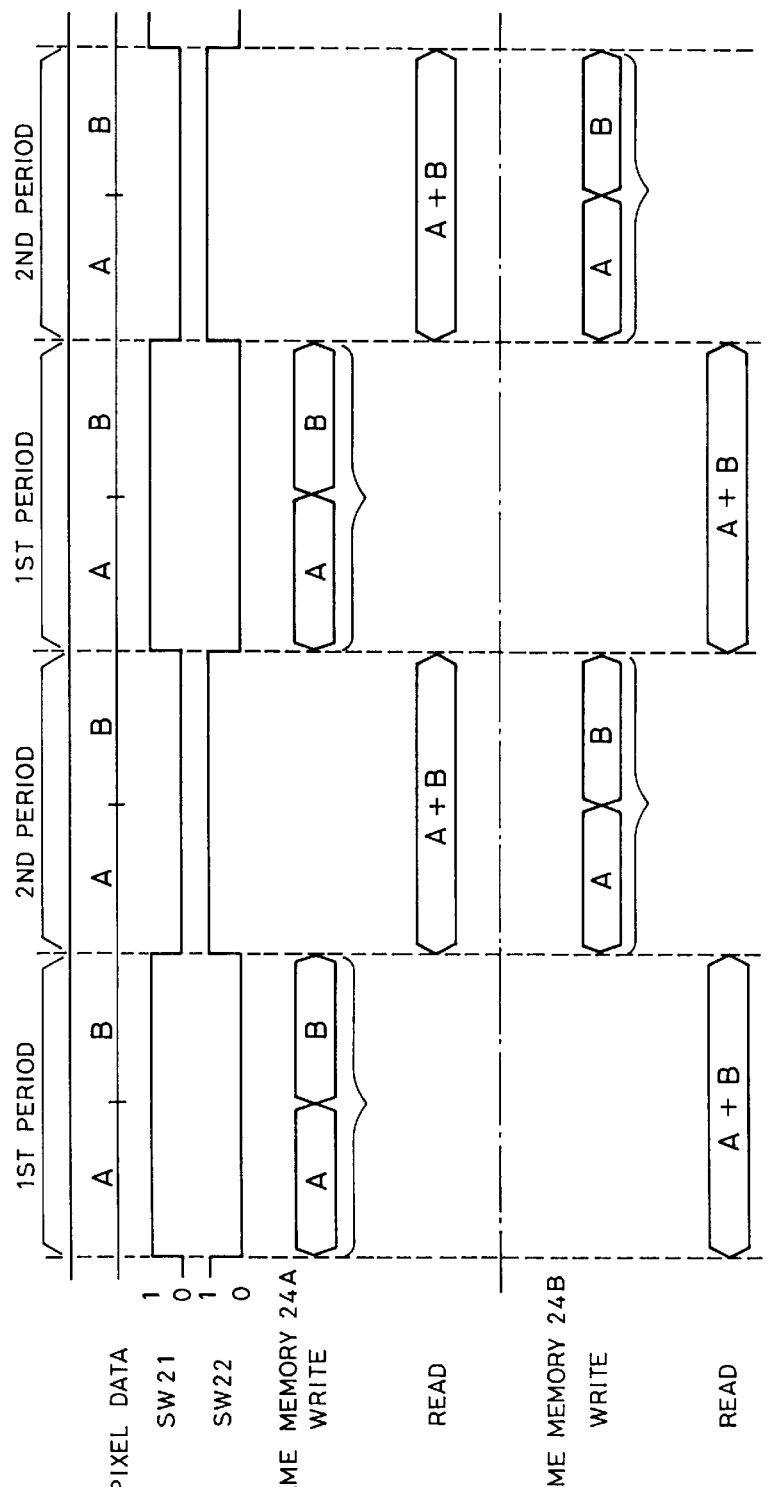
FIGS. 4A to 4G are diagrams for explaining the first embodiment showing the relation between the writing and reading operations of pixel data by the driving apparatus of FIG. 3 and frame memories.

Subsequently, the control circuit 22 sends a control signal to each of the switches SW21 and SW22 and, as shown in FIGS. 4B and 4C, enters a first period of time during which the switch SW21 connects the data processing circuit 23 to the frame memory 24A through the contact "1" and the switch SW22 connects the frame memory 24B to the column electrode driver 26 through the contact "0". In the first period of time, the pixel data is written into the frame memory 24A and the pixel data is read out from the frame memory 24B. When the writing of all of the pixel data to the frame memory 24A is completed, the control circuit 22 enters a second period of time during which the switch SW21 is switched to the contact "0" and connects the image data processing circuit 23 to the frame memory 24B and the switch SW22 is switched to the contact "1" and connects the frame memory 24B to the column electrode driver 6. In the second period of time, the frame memory 24A enters the reading mode of the pixel data and the frame memory 24B enters the writing mode of the pixel data. When the writing of all of the pixel data to the frame memory 24B is completed, the connection destination of each of the switches SW21 and SW22 is switched and the control circuit again enters the first period of time. The above state is repeated.

The writing and reading operations of the pixel data to/from the frame memory in the first and second periods will now be described in detail mainly with respect to the frame memory 24A.

Figure 5:
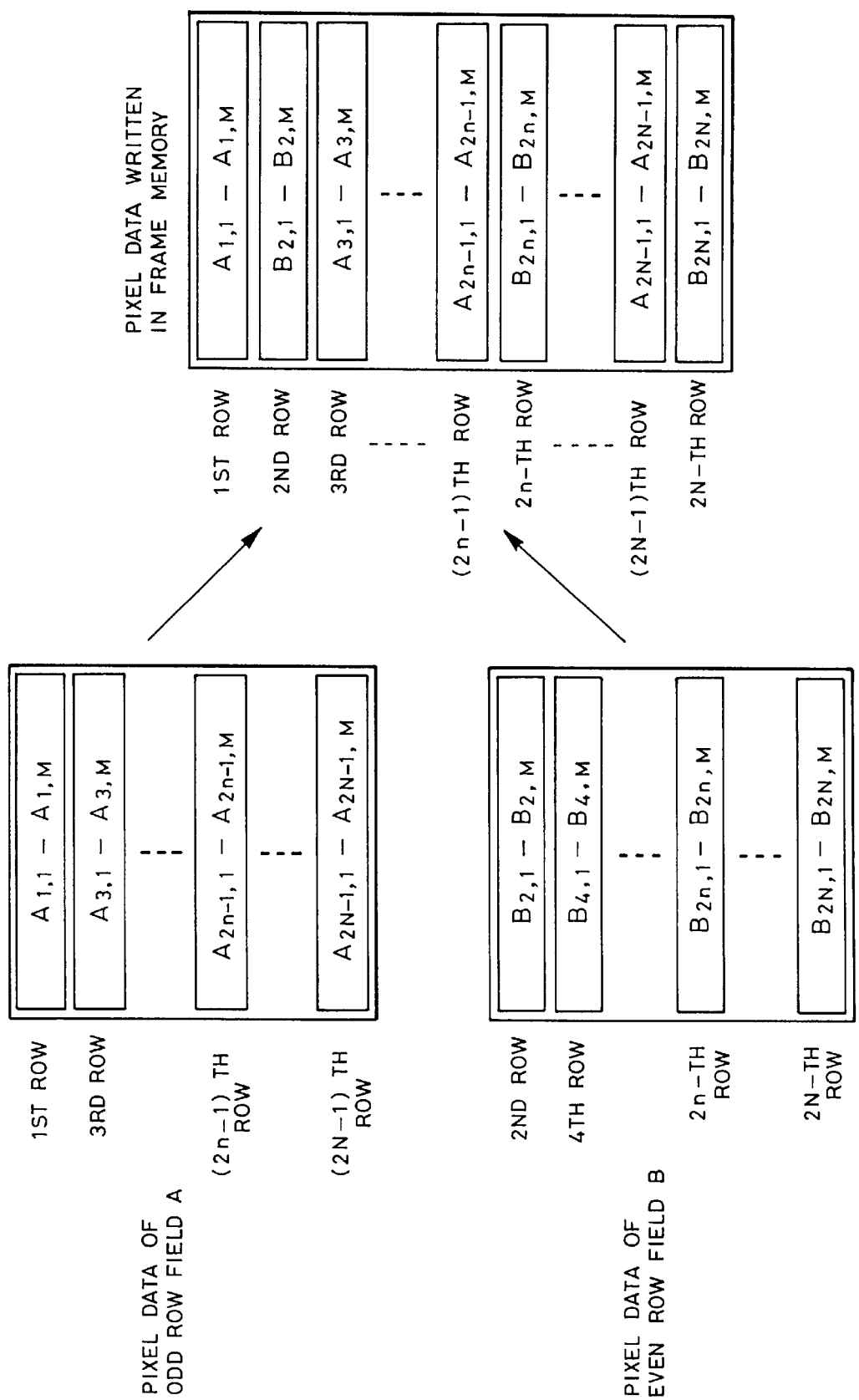
FIG. 5 is a diagram showing the relation between each field and data which is written into the frame memories.

First as shown in FIG. 4D, in the first period, the frame memory 24A is connected to the image data processing circuit 23. The pixel data of one frame comprises: an odd row field A consisting of the pixel data corresponding to the odd number (2n−1) designated scanning lines (where, $1 \leq n \leq N$) of the PDP 28 formed by the interlaced scanning; and an even row field B consisting of the pixel data corresponding to the even number (2n) designated scanning lines of the PDP 28. The pixel data is sent from the image data processing circuit 23 to the frame memory 24A in accordance with the order of the odd row field A and the even row field B. The pixel data of the odd row field A is written as follows. That is, for example, as shown in FIG. 5, the pixel data $A_{(2n-1),1}$–$A_{(2n-1),M}$ of the (2n–1)th (where, $1 \leq n \leq N$) scanning line is sequentially written into the (2n–1)throw of the frame memory 24A in accordance with the order from the pixel data $A_{1,1}$–$A_{1,M}$ of the first scanning line by the memory control circuit 27 every timing of the clock signal CK2 that is supplied from the memory control circuit 27. That is, the pixel data $A_{1,1}$–$A_{1,M}$ of the first scanning line is written into the first row of the frame memory 24A. The pixel data $A_{3,1}$–$A_{3,M}$ of the third scanning line is written into the third row of the frame memory 24A. Finally, the pixel data $A_{(2n-1),1}$–$A_{(2N-1),M}$ of the (2N–1)th scanning line is sequentially written into the (2N–1)th row of the frame memory 24A.

Subsequently, the even row field B is written into a free even address 2n in the frame memory 24A. That is, the pixel data $B_{2n,1}$–$B_{2n,M}$ of the 2n-th (where, $1 \leq n \leq N$) scanning line is sequentially written into the even-number 2n-th row of the frame memory 24A in accordance with the order from the pixel data $B_{2,1}$–$B_{2,M}$ of the second scanning line by the memory control circuit 27 every timing of the clock signal CK2 that is supplied from the memory control circuit 27. That is, the pixel data $B_{2,1}$–$B_{2,M}$ of the second scanning line is written into the second row of the frame memory 24A. The pixel data $B_{4,1}$–$B_{4,M}$ of the fourth scanning line is written into the fourth row of the frame memory 24A. Finally, the pixel data $B_{2N,1}$–$B_{2N,M}$ of the 2N-th scanning line is sequentially written into the 2N-th row of the frame memory 24A.

Subsequently, in the second period, the frame memory 24A is disconnected from the image data processing circuit 23 and is connected to the column electrode driver 26. Therefore, the pixel data of every scanning line is sequentially read out from the frame memory 24A from the first row, for example, every timing of the clock signal CK2 of the same frequency as that in the case of the writing operation and is supplied as pixel drive data to the column electrode driver 26. For the second period of time, the image display of one time is performed in the PDP 28 as mentioned above.

As shown in FIG. 6E, the pixel data of each scanning line is sequentially read out from the frame memory 24A from the first row at every timing of a clock signal CK2' having a frequency (2·f$_2$) that is twice as high as the frequency of the clock signal CK2 upon writing. Just after completion of the reading operation of the pixel data of the first time for all of the scanning lines of the PDP 28, this reading operation is again repeated and the same image can be also displayed twice for the second period.

Although the frame memory 24B performs substantially the same operation as that of the frame memory 24A, as shown in FIGS. 4F and 4G and FIGS. 6F and 6G, the writing of the pixel data of the frame is executed in the second period of time and the reading operation of the written pixel data is performed in the next first period of time subsequent to the second period in a manner opposite to the case of the frame memory 24A.

As mentioned above, the writing and reading operations are alternately performed by using two frame memories and the pixel data of one frame consisting of two fields formed by the interlaced scanning is sequentially fetched into the frame memory in accordance with the field order. Upon reading out, when the image of the video signal generated by the interlaced scanning is displayed by supplying the data to the column electrode driver 26 as pixel data of one frame of the progressive scan, for example, there is no need to interpolate the pixel data between the scanning lines of the odd rows.

A driving apparatus of a display panel of the third embodiment of the invention will now be described hereinbelow with reference to FIG. 7.

FIG. 7 shows a construction of a plasma display apparatus which has the driving apparatus according to the invention and can display a color image.

In FIG. 7, an A/D converter 31 obtains the pixel data D of every pixel by sampling the supplied video signal in response to the clock signal CK1 of a predetermined frequency that is supplied from a control circuit 32 and sequentially transmits the pixel data D to an image data processing circuit 33.

The image data processing circuit 33 is constructed by, for example, a false outline processing circuit to execute a data process in response to the clock signal CK1 that is supplied from the control circuit 32 or the like. The image data processing circuit 33 realizes, for example, a pseudo intermediate display by reducing the number of bits of the pixel data, forms the pixel data in which the false outline has been compensated, and generates it.

Each of field memories 34A and 34B has a capacity capable of storing at least the pixel data of one field. The field memories 34A and 34B are connected to the image data processing circuit 33 via switches SW31 and SW32 which are serially connected, respectively. Each of the field memories 34A and 34B has the same address construction as that of the pixels of a plasma display panel 36 forming the screen. Further, output portions of the field memories 34A and 34B are alternately connected to a column electrode driver 35 through a switch SW33.

The switching of the switches SW31, SW32, and SW33 is performed by a control signal from the control circuit 32.

The switch SW32 alternately connects the field memories 34A and 34B to the image data processing circuit 33 at every timing of the clock signal CK2 of a predetermined frequency which is supplied from the control circuit 32. The switch SW33 is switched every timing of the clock signal CK2 which is supplied from the control circuit 32 and alternately connects the field memories 34A and 34B to the column electrode driver 35. The switching of the switches SW32 and SW33 is controlled by the control circuit 32 as follows. That is, for instance, when the switch SW32 connects the image data processing circuit 33 to the field memory 34A (a switch contact is set to "a") at the timing of the clock signal CK2, the switch SW33 connects the field memory 34B to the column electrode driver 35 (a switch contact is set to "b"). When the switch SW32 connects the image data processing circuit 33 to the field memory 34B (a switch contact is set to "b"), the switch SW33 connects the field memory 34A to the column electrode driver 35 (a switch contact is set to "a"). The switching operation of the switch SW31 will be described later.

The column electrode driver 35 separates the pixel drive data of one field that is read out from the field memories 34A and 34B every bit, generates a pixel data pulse having a voltage value corresponding to each of the logical values "1" and "0" of the bit, and applies it to the column electrode of the plasma display panel (PDP) 36.

Various control signals such as write enable signal, read enable signal, and the like are supplied from a memory control circuit 37 to the field memories 34A and 34B.

The memory control circuit 37 controls addresses in the field memories 34A and 34B in accordance with an output signal from the control circuit 32 and controls the writing and reading operations in the field memories 34A and 34B of the pixel data that is supplied from the image data processing circuit 33.

Operating means 38 sets and resets a motion image/still image mixture mode which enables a motion image and a still image to be simultaneously displayed on the screen and supplies a motion image/still image mixture mode designation signal to the control circuit 32.

The control circuit 32 includes the memory control circuit 37 and is connected to the A/D converter 31, image data processing circuit 33, switches SW31, SW32, and SW33, operating means 38, and a row electrode driver 39. The control circuit 32 forms the clock signals CK1 and CK2, supplies the formed clock signal CK2 to the memory control circuit 37, further forms a reset timing signal, a scan timing signal, a maintaining timing signal, and an erasure timing signal, and supplies them to the row electrode driver 39. The clock signal CK2 is formed from horizontal and vertical sync signals of the supplied video signal and corresponds to one field of the pixel data.

The row electrode driver 39 forms a reset pulse to initialize a residual charge amount, a scan pulse to write the pixel data, a maintaining pulse to maintain a discharge light emitting state, and an erasure pulse to stop the discharge light emission in response to the various timing signals and supplies them to a pair of row electrodes of the PDP 36. In this instance, the scan pulse is applied to the row electrode pair by the progressive scan.

When the scan pulse is applied to the PDP 36 from the row electrode driver 39 for a time interval during which the pixel data pulse is applied from the column electrode driver 35, the charges corresponding to the applied pixel data pulse are accumulated in the PDP 36. In this instance, light is emitted in an intersecting portion of the column electrode to which the pixel data pulse corresponding to, for example, the logic "1" has been applied and the row electrode pair to which the scan pulse has been applied. The intersecting portion corresponds to each pixel on the screen of the PDP 36. After that, when the maintaining pulse is applied from the row electrode driver 39, the light emitting state is maintained only for a period of time corresponding to the number of maintaining pulses applied.

Further, an arithmetic operation processing circuit 40 is connected between the switches SW31 and SW33. The arithmetic operation processing circuit 40 executes, for example, an arithmetic operating process such as decimating process, reducing process, or the like of a predetermined number of pixels for the number of pixels of one field which are received through the switch SW33 and generates an arithmetic operation result.

An embodiment of the operation of the driving apparatus will now be described with reference to FIGS. 7 to 10.

In a "motion image display mode" to display the supplied video signal as a motion image in a real-time manner, the control circuit 32 alternately sets the operating mode, for instance, sets one of the memories 34A and 34B to a writing mode and sets the other to a reading mode in response to the vertical and horizontal sync signals of the supplied video signal, namely, in accordance with the clock CK2. The memory control circuit 37 forms write enable signals WR1 and WR2 and read enable signals RD1 and RD2 which are necessary for the writing and reading operations of the memories 34A and 34B in response to the clock CK2 from the control circuit 32 and supplies them to each memory. The pixel data of one field, therefore, is alternately written into the memories 34A and 34B and the written pixel data is alternately read out from the memories 34A and 34B. This state is shown in FIGS. 8A to 8N.

As shown in FIGS. 8D, 8E, and 8F, in a state where the switch SW31 is connected to the contact "b" by the control circuit 32, the motion image display mode alternately has a "first motion image displaying period" (Ia) and a "second motion image displaying period" (Ib) and repeats these periods (Ia) and (Ib). That is, in the first motion image displaying period (Ia), the switch SW32 is connected to the contact "a", the switch SW33 is connected to the contact "b", the pixel data is written into the memory 34A, the pixel data is read out from the memory 34B, and a duration corresponds to a generating period of the clock signal CK2. In the second motion image displaying period (Ib), the switch SW32 is connected to the contact "b", the switch SW33 is connected to the contact "a", the pixel data is written into the memory 34B, the pixel data is read out from the memory 34A, and a duration corresponds to the generating period of the clock signal CK2.

That is, in each of the motion image displaying period, the supplied video signal is sampled by the A/D converter 31 and becomes the pixel data of every pixel. Subsequently, the pixel data is sent to the image data processing circuit 33 and is subjected to an image process such as a false outline process or the like by the image data processing circuit 33. The processed pixel data is transmitted to the field memories 34A and 34B.

For example, the first motion image displaying period comes at time $t_0$ and pixel data A1 of one field is written into the field memory 34A by the write enable signal WR1 shown in FIG. 8G (refer to FIG. 8H). The written pixel data is read out from the field memory 34B (not shown). The second motion image displaying period comes at time $t_1$ when the writing of the pixel data to the field memory 34A ends.

In the second motion image displaying period, the written pixel data A1 is read out from the field memory 34A by the read enable signal RD1 (refer to FIG. 8I) and is sent to the column electrode driver 35 (refer to FIG. 8J). Pixel data A2 of one field is written into the field memory 34B (refer to FIG. 8L) by the write enable signal WR2 (refer to FIG. 8K).

When the motion image/still image mixture mode designation signal is supplied from the operating means 38 to the control circuit 32 at time $t_2$ when the second motion image displaying period ends, the apparatus enters the "motion image/still image display mode". In the embodiment, the "motion image/still image display mode" comprises a "still image writing mode" corresponding to the time of the duration of two fields of the pixel data and a "motion image/still image mixture mode" after that. The still image writing mode is a mode to write a still image which is displayed in the motion image/still image mixture mode into the field memories 34A and 34B.

In the embodiment, the still image which is displayed in the motion image/still image mixture mode is the pixel data A2 which was finally read out from the field memory 34B in the motion image display mode. This will be explained hereinbelow.

In the still image writing mode, at time $t_2$ when the still image writing mode is started, the switch SW31 is connected to the contact "a", the switch SW32 is connected to the contact "a", and the switch SW33 is connected to the contact "b". In this instance, the pixel data A2 read out from the field memory 34B by the read enable signal RD2 is supplied to the column electrode driver 35 and as shown in, for example, FIG. 7, it is written into the field memory 34A through the arithmetic operating circuit 40 and switches SW31 and SW32 by the write enable signal WR1. As a method of reducing the pixel data, for instance, only the pixels of the number that is equal to ½ in the lateral direction of the number of pixels of one field are decimated and the decimated pixel data is written into the memory 34A. That is, the arithmetic operating circuit 40 performs a reducing process such that the pixels are decimated into ½ of the number of pixels in the horizontal direction of the supplied pixel data or the like and generates the reduced pixel data. As shown in FIGS. 9 and 10, the pixel data generated from the arithmetic operation processing circuit 40 is written into a storage area SA1 corresponding to, for example, ½ of the storage area in the memory 34A by the address control of the memory control circuit 37. A residual storage area SA2 in the memory 34A remains without being rewritten.

At time $t_3$ when the writing operation of the pixel data A2 to the memory 34A ends, a state where the switch SW31 is connected to the contact "a" is maintained, the switch SW32 is connected to the contact "b", the switch SW33 is connected to the contact "a", and the pixel data read out from the field memory 34A is supplied to the column electrode driver 35. Since the address construction of the memory 34A corresponds to the pixel construction of the PDP 36, the image corresponding to the pixel data which was decimated into ½ in the lateral direction is displayed as a still image in the right half region of the screen of the PDP 36.

As shown in FIG. 10, the pixel data read out from the field memory 34A is copied into the field memory 34B through the arithmetic operating circuit 40 by the write enable signal WR2.

The pixel data which is displayed as a still image is written into the memories 34A and 34B as mentioned above, respectively.

At time $t_4$ when the writing of the pixel data to the memory 34B ends, the apparatus enters the motion image/still image mixture mode and the switch SW31 is switched to the contact "b" by the control circuit 32. In a manner similar to the motion image display mode, the control circuit 32 alternately sets the operating mode, namely, sets one of the memories 34A and 34B to the writing mode and sets the other to the reading mode in response to the clock CK2. The supplied video signal, therefore, is alternately written into the storage areas for motion image in the memories 34A and 34B and the written pixel data and the pixel data for still image are alternately read out from the memories 34A and 34B. That is, as shown in FIGS. 8D, 8E, and 8F, the motion image/still image mixture display mode alternately has a "first mixture displaying period of time" (Ma) and a "second mixture displaying period of time" (Mb) and repeats these periods (Ma) and (Mb). That is, in the first mixture displaying period (Ma), the switch SW32 is connected to the contact "a", the switch SW33 is connected to the contact "b", the pixel data is written into the memory 34A, the pixel data is read out from the memory 34B, and a duration corresponds to the generating period of the clock CK2. In the second mixture displaying period (Mb), the switch SW32 is connected to the contact "b", the switch SW33 is connected to the contact "a", the pixel data is written into the memory 34B, the pixel data is read out from the memory 34A, and a duration corresponds to the generating period of the clock CK2. Further, in the motion image/still image mixture mode, in each of the field memories 34A and 34B, the pixel data is not written into the storage area SA1 in which the still image has been written.

That is, in each of the mixture displaying periods, the supplied video signal is sent to the field memories 34A and 34B and is written into only the storage areas SA2 and SA2 in the memories 34A and 34B by the address control of the memory control circuit 37.

That is, for example, the first mixture displaying period starts at time $t_4$ and the number of pixels in the horizontal direction of the pixel data C1 of one field is reduced in accordance with the storage area SA2 by the memory control circuit, and the reduced pixel data is written into the field memory 34A by the write enable signal WR1 (refer to FIG. 9). The written pixel data is read out from the field memory 34B. At time $t_5$ when the writing of the pixel data to the field memory 34A ends, the second mixture displaying period starts.

In the second mixture displaying period, the written pixel data C1 and still image A2 are read out from the field memory 34A by the read enable signal RD1 (refer to FIG. 8I) and are sent to the column electrode driver 35. The number of pixels in the horizontal direction of the pixel data C2 of one field is reduced in accordance with the storage area SA2 by the memory control circuit 37 and the reduced pixel data is written into the field memory 34B by the write enable signal WR2 (refer to FIG. 8K).

As mentioned above, the pixel data to be displayed as a still image is written into both of the memories 34A and 34B, the writing operation of the subsequent pixel data is limited to the predetermined areas in the memories, and the written pixel data for still image is held, so that the picture plane of the PDP 36 corresponding to the storage areas of the memories becomes a still image and a motion image corresponding to the pixel data that is successively received can be displayed in the other portion.

The fourth embodiment of a driving apparatus of a display according to the invention and its operation will now be described with reference to FIG. 11 and FIGS. 12A to 12N.

Figure 11:
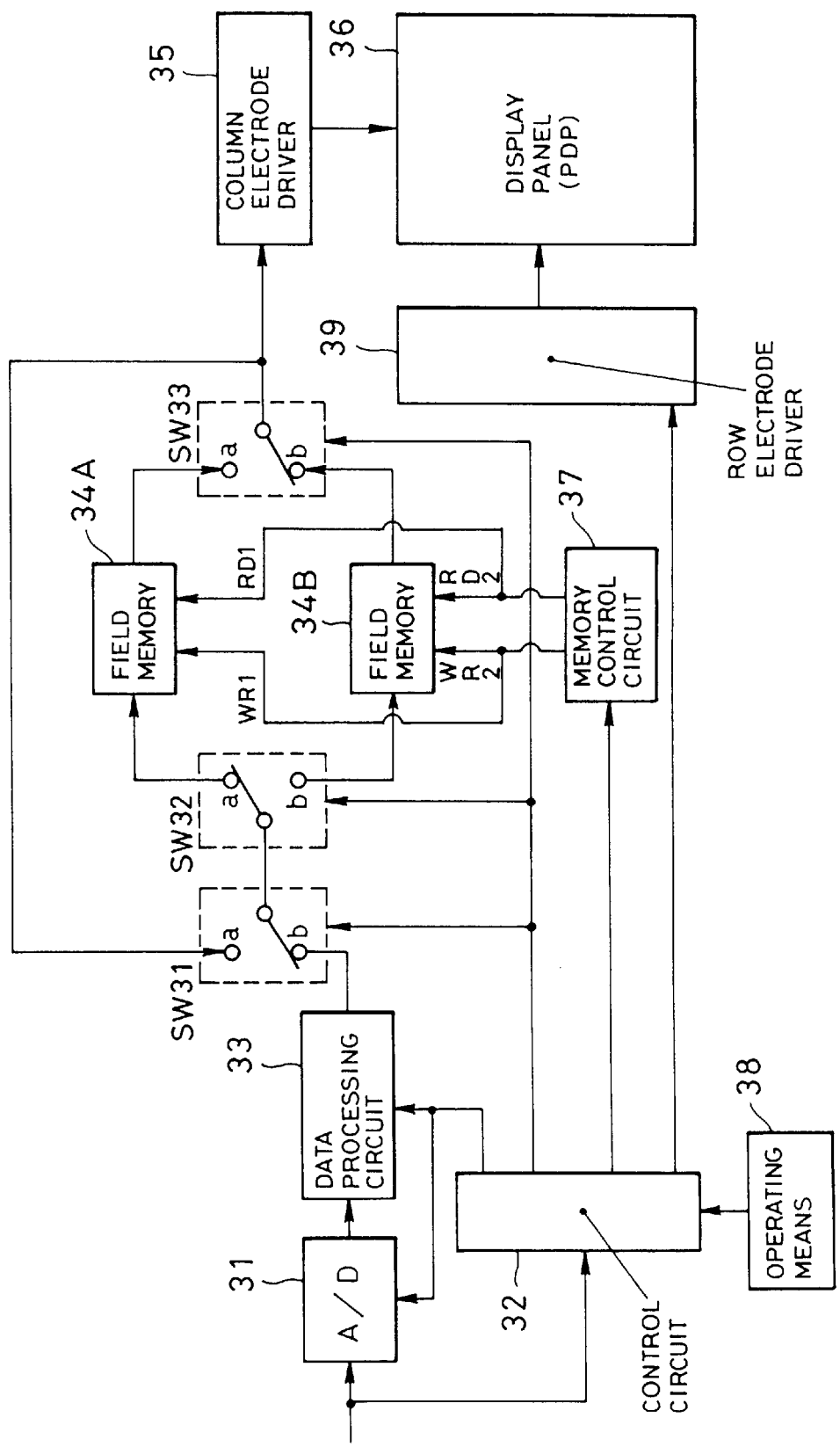
FIG. 11 is a diagram showing the construction of the second embodiment of a driving apparatus of a PDP according to the invention.

Although the driving apparatus shown in FIG. 11 has a construction similar to that of the driving apparatus shown in FIG. 7, the arithmetic operating circuit between the switches SW31 and SW33 is omitted and the pixel data read out from the memories 34A and 34B is directly transmitted to the memories 34A and 34B via the switches SW31 and SW32. In FIG. 7, the same component elements as those shown in FIG. 1 are designated by the same reference numerals.

The operation of the driving apparatus of FIG. 11 will now be described with reference to FIGS. 12A to 12N.

The operation in the motion image display mode of the driving apparatus is substantially the same as that of the driving apparatus shown in FIG. 7. That is, in the "motion image display mode" to display the supplied video signal as a motion image in a real-time manner, the control circuit 32 alternately sets the operation mode, namely, sets one of the memories 34A and 34B to the writing mode and sets the other to the reading mode in response to the vertical and horizontal sync signals of the supplied video signal. The memory control circuit 37 forms the write enable signals WR1 and WR2 and read enable signals RD1 and RD2 which are necessary for the writing and reading operations of the memories 34A and 34B in response to the clock CK2 from the control circuit 32 and supplies them to the memories. The pixel data of one field, therefore, is alternately written into the memories 34A and 34B and the written pixel data is alternately read out from the memories 34A and 34B.

As shown in FIGS. 12D, 12E, and 12F, in a state where the switch SW31 is connected to the contact "b" by the control circuit 32, the motion image display mode alternately has the "first motion image displaying period" (Ia) and the "second motion image displaying period" (Ib) and repeats these periods (Ia) and (Ib). That is, in the first motion image displaying period (Ia), the switch SW32 is connected to the contact "a", the switch SW33 is connected to the contact "b", the pixel data is written into the memory 34A, the pixel data is read out from the memory 34B, and a duration corresponds to the generating period of the clock signal CK2. In the second motion image displaying period (Ib), the switch SW32 is connected to the contact "b", the switch SW33 is connected to the contact "a", the pixel data is written into the memory 34B, the pixel data is read out from the memory 34A, and a duration corresponds to the generating period of the clock signal CK2.

That is, in each motion image displaying period, the supplied video signal is sampled by the A/D converter 31 and becomes the pixel data of every pixel. The pixel data is subsequently sent to the image data processing circuit 33 and is subjected to an image process such as a false outline process or the like by the image data processing circuit 33. The processed data is sent to the field memories 34A and 34B.

For example, the first motion image displaying period starts at time $t_0$ and the pixel data A1 of one field is written into the field memory 34A by the write enable signal WR1 shown in FIG. 12G (refer to FIG. 12H). The written pixel data is read out from the field memory 34B (not shown). At time $t_1$ when the writing of the pixel data to the field memory 34A ends, the second motion image displaying period starts.

In the second motion image displaying period, the written pixel data A1 is read out from the field memory 34A by the read enable signal RD1 (refer to FIG. 12I) and is sent to the column electrode driver 35 (refer to FIG. 12J). The pixel data A2 of one field is written into the field memory 34B (refer to FIG. 12L) by the write enable signal WR2 (refer to FIG. 12K).

At time $t_2$ when the second motion image displaying period ends, when the motion image/still image mixture mode designation signal is supplied from the operating means 38 to the control circuit 32, the apparatus enters a "motion image/still image display mode". In the embodiment, the "motion image/still image display mode" comprises a "still image writing mode" corresponding to the time of a duration of one field of the pixel data and a subsequent "motion image/still image mixture mode". The still image writing mode is a mode for allowing a still image which is displayed in the motion image/still image mixture mode to be left in the memories 34A and 34B.

In the embodiment, the still image which is displayed in the motion image/still image mixture mode is a part of the pixel data A2 which was finally read out from the field memory 34B in the motion image display mode. This will be explained hereinbelow.

At time $t_2$ when the still image writing mode is started, in the still image writing mode, the switch SW31 is connected to the contact "a", the switch SW32 is connected to the contact "a", and the switch SW33 is connected to the contact "b". In this instance, the pixel data A2 read out from the field memory 34B by the read enable signal RD2 is supplied to the column electrode driver 35 and is written into the field memory 34A by the write enable signal WR1 via the switches SW31 and SW32 as shown in FIG. 11. As for the pixel data transferred from the memory 34B to the memory 34A, for example, only the pixel data A2 having the address corresponding to the storage area SA1 corresponding to ½ of the storage area in the memory 34A corresponding to the address of the pixel data that is displayed as a still image is written into the storage area SA1 in the memory 34A by the address control of the memory control circuit 37 (refer to FIG. 13). The residual storage area SA2 in the memory 34A becomes a storage area for displaying a motion image.

At time $t_3$ when the writing of the pixel data A2 to the memory 34A ends, the apparatus enters the motion image/still image mixture mode and the switch SW31 is switched to the contact "b" by the control circuit 32. The control circuit 32 alternately sets the operating mode, for example, sets one of the memories 34A and 34B to the writing mode and sets the other to the reading mode in response to the vertical and horizontal sync signals of the supplied video signal in a manner similar to the case of the motion image display mode. The supplied video signal, therefore, is alternately written into the memories 34A and 34B and the written pixel data is alternately read out from the memories 34A and 34B.

In this instance, as shown in FIGS. 12D, 12E, and 12F, the motion image/still image mixture mode alternately has the "first mixture displaying period of time" (Ma) and the "second mixture displaying period of time" (Mb) and repeats these periods (Ma) and (Mb) and repeats these periods (Ma) and (Mb). That is, in the first mixture displaying period (Ma), the switch SW32 is connected to the contact "b", the switch SW33 is connected to the contact "a", the pixel data is written into the memory 34B, the pixel data is read out from the memory 34A, and a duration corresponds to the generating period of the clock signal CK2. In the second mixture displaying period (Mb), the switch SW32 is connected to the contact "a", the switch SW33 is connected to the contact "b", the pixel data is written into the memory 34A, the pixel data is read out from the memory 34B, and a duration corresponds to the generating period of the clock signal CK2.

Figure 15:
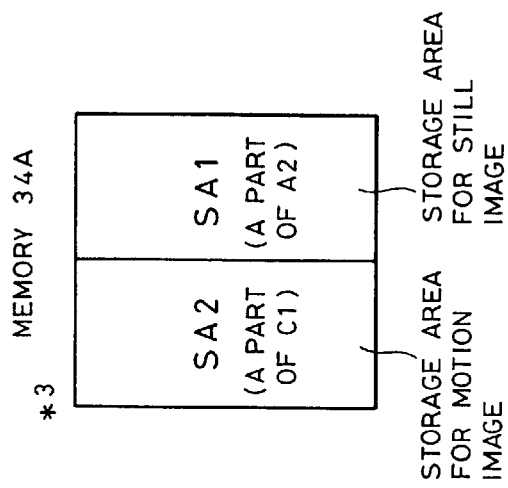
FIGS. 13 to 16 are diagrams for explaining states of memories of the driving apparatus of FIG. 11.
Figure 14:
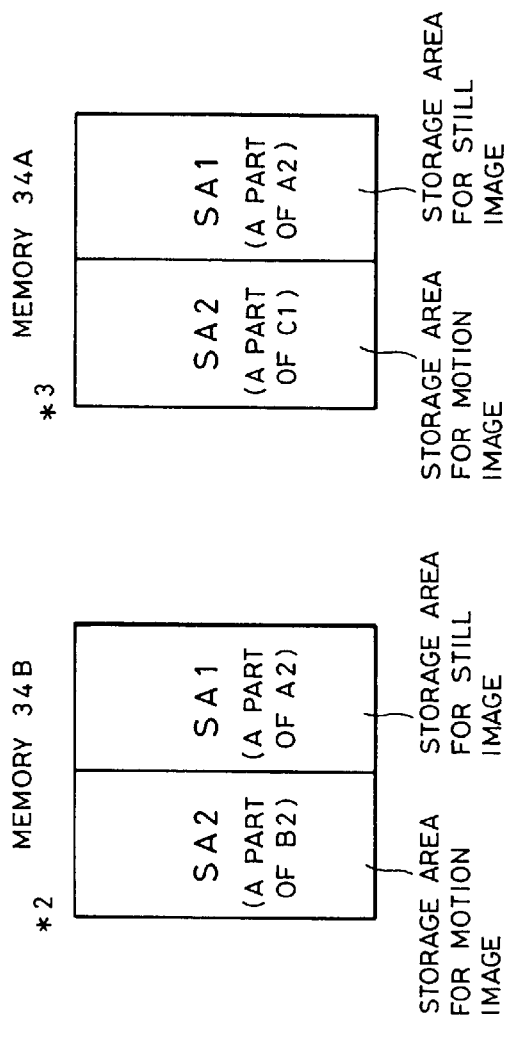
Figure 13:
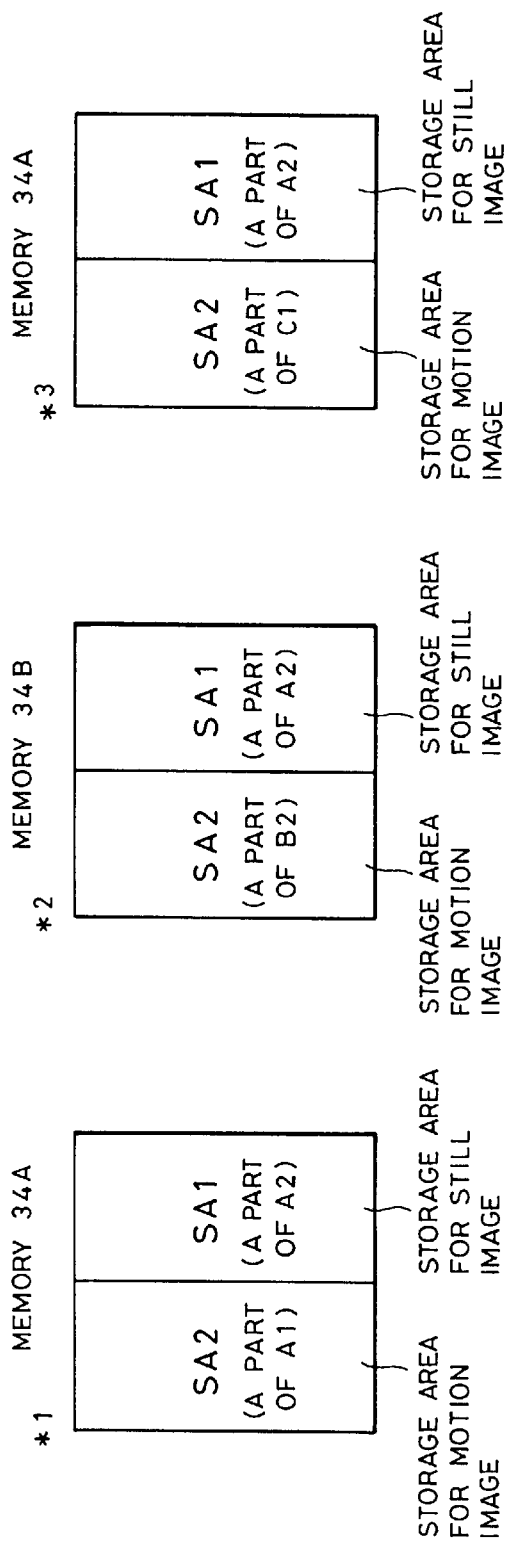
Figure 16:
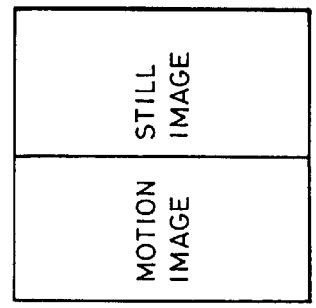

In each of the mixture displaying periods, the supplied video signal is sent to the field memories 34A and 34B and is written into only the storage areas SA2 and SA2 for a motion image in the memories 34A and 34B by the address control of the memory control circuit 37 as shown in FIGS. 13 to 15.

That is, the first mixture displaying period starts at time $t_3$, and in the field memory 34B, the number of pixels in the horizontal direction in the pixel data B2 of one field is reduced in accordance with the address in the storage area SA2 for a motion image by the memory control circuit and the reduced pixel data is written into only the storage area SA2 for a motion image by the write enable signal WR2 (refer to FIG. 14). In the storage area SA1 in the memory 34B, the pixel data is not rewritten. In this case, the pixel data in the storage area SA1 in the memory 34B which is not rewritten coincides with the pixel data which has already been written in the storage area SA1 in the memory 34A.

The second mixture displaying period starts at time $t_4$ when the writing of the pixel data to the field memory 34B ends.

In the second mixture displaying period, the written pixel data B2 and the still image A2 which is not rewritten are read out from the field memory 34B by the read enable signal RD2 (refer to FIG. 12M) and are transmitted to the column electrode driver 35 (refer to FIG. 12N). In the field memory 34A, the number of pixels in the horizontal direction in the pixel data C1 of one field is reduced and the reduced pixel data is written into the storage area SA2 for a motion image (refer to FIG. 12H) by the memory control circuit by the write enable signal WR1 (refer to FIG. 12G).

As mentioned above, the pixel data to be displayed as a still image is written into both of the memories 34A and 34B and the pixel data for a still image which has been written by limiting the writing area of the subsequent pixel data to a predetermined area in the memory is held. As shown in FIG. 12D, consequently, the picture plane of the PDP corresponding to the storage area in the memory becomes a still image and the other portion of the PDP can be set to a motion image corresponding to the pixel data that is successively supplied.

Another embodiment of the operation of the driving apparatus shown in FIG. 11 will now be described hereinbelow with reference to FIGS. 17A to 17N and FIGS. 18 to 20.

The operation in the motion image display mode of the driving apparatus is substantially the same as that in the motion display mode shown in FIGS. 12A to 12N. That is, in the "motion image display mode", to display the supplied video signal as a motion image in a real-time manner, the control circuit 32 alternately sets the operating mode, namely, sets one of the memories 34A and 34B to the writing mode and sets the other to the reading mode in response to the vertical and horizontal sync signals of the supplied video signal. The memory control circuit 37 forms the write enable signals WR1 and WR2 and read enable signals RD1 and RD2 which are necessary for the writing and reading operations of the memories 34A and 34B in response to the clock CK2 from the control circuit 32 and supplies them to the memories. The pixel data of one field, therefore, is alternately written into the memories 34A and 34B and the written pixel data is alternately read out from the memories 34A and 34B.

When the motion image/still image mixture mode designation signal is supplied from the operating means 38 to the control circuit 32 at time $t_2$ when the second motion image displaying period ends, the apparatus enters the "motion image/still image display mode".

As shown in FIGS. 17D, 17E, and 17F, the motion image/still image display mode alternately has the "first mixture displaying period of time" (Ma) and the "second mixture displaying period of time" (Mb) and repeats these periods (Ma) and (Mb). That is, in the first mixture displaying period (Ma), the switch SW32 is connected to the contact "a", the switch SW33 is connected to the contact "b", the pixel data is written into the memory 34A, the pixel data is read out from the memory 34B, and a duration corresponds to the generating period of the clock signal CK2. In the second mixture displaying period (Mb), the switch SW32 is connected to the contact "b", the switch SW33 is connected to the contact "a", the pixel data is written into the memory 34B, the pixel data is read out from the memory 34A, and a duration corresponds to the generating period of the clock signal CK2.

At time $t_2$ when the first mixture displaying period is started, the switch SW32 is connected to the contact "a" and the switch SW33 is connected to the contact "b". In this instance, as for the supplied video signal B1 of one field, for example, the number of pixel data in the horizontal direction is reduced and the reduced data is written into only the storage area SA2 for a motion image in the memory 34A corresponding to the address of the picture plane to display a motion image as shown in FIG. 18 by the address control of the memory control circuit 37. A part of the pixel data A1 written in the storage area SA1 excluding the storage area SA2 for a motion image which is not rewritten, therefore, is maintained as pixel data for a still image without being rewritten.

At time $t_3$ when the writing of the pixel data B1 to the memory 34A ends, the second mixture displaying period starts and as for the supplied video signal B2 of one field, for example, the number of pixel data in the horizontal direction is reduced and the reduced data is written into only the storage area SA2 for a motion image in the memory 34B corresponding to the address of the picture plane to display a motion image as shown in FIG. 19 by the address control of the memory control circuit 37. A part of the pixel data A2 written in the storage area SA1 excluding the storage area SA2 for a motion image which is not rewritten, therefore, is maintained as pixel data for a still image without being rewritten. The written pixel data is read out from the memory 34A and is displayed on the PDP 36.

In each of the mixture displaying periods, as mentioned above, as shown in FIG. 20, the supplied video signal is sent to the field memories 34A and 34B and is written by limiting the storage areas to only the storage areas SA2 and SA2 for a motion image in the memories 34A and 34B by the address control of the memory control circuit 37 and is displayed as a motion image. At the same time, the pixel data which is not rewritten in each memory is read out a plurality of number of times and is displayed as a still image by the PDP 36.

In each of the embodiments, although the motion image has been displayed in the area of ½ of the screen and the still image has been displayed in the remaining area, sizes of the display areas of the motion image and the still image can be set to arbitrary sizes.

The driving method of the driving apparatus can be also applied to a channel guiding function for displaying a plurality of images to one screen and displaying one of the images as a motion image for a predetermined period of time.

The driving apparatus can be also further applied to a driving apparatus of a PDP with a construction such that one field is divided into a plurality of subfields and one picture plane is displayed.

What is claimed is:

1. A driving apparatus of a display panel, comprising:
   a television signal receiving circuit for receiving a television broadcasting wave, generating a video signal, and enabling a receiving station to be changed in accordance with an instruction;
   a sync signal separating circuit for detecting a sync signal from said video signal;
   an A/D converter for obtaining corresponding pixel data every pixel by sampling said video signal;
   first and second memories each having a capacity to store at least pixel data of one field;
   self-advancing clock signal generating means for generating a self-advancing clock signal, said self-advancing clock signal having a frequency identical with said sync signal, and generated independently of said sync signal so that synchronization between said self-advancing clock signal and said sync signal is absent;
   control means for controlling said first and second memories so as to write the pixel data of one field alternately into said first and second memories and read the written pixel data of one field alternately from said first and second memories in response to said self-advancing clock signal; and
   display driving means for driving the display panel on the basis of the pixel data, which is read out from, said first and second memories,
   wherein said control means switches the writing and reading operations of each of said memories synchronously with said self-advancing clock signal each time that is twice or more as long as a generating period of said self-advancing clock signal and writes the pixel data of one field alternately into each of said memories for each of a plurality of fields in response to said sync signal which is detected just after said each of said memories has been switched from the reading to the writing, and said control means reads the pixel data written synchronously with said self-advancing clock signal and supplies it to said display driving means.

2. An apparatus according to claim 1, wherein said self-advancing clock signal has a same period as that of the sync signal of said video signal.

3. A driving apparatus of a display panel, comprising:

an A/D converter for obtaining corresponding pixel data for every pixel by sampling a video signal;

first and second memories for storing said pixel data;

memory control means for controlling writing and reading operations of said first and second memories so as to alternately write said pixel data into said first and second memories and alternately read out said written pixel data from said first and second memories;

display driving means for driving the display panel on the basis of the pixel data which is read out from said first and second memories;

means for designating a motion image/still image mixed display mode;

reduction processing means for reducing in number pixel data read out from one of said memories, wherein each of said first and second memories has first and second storage areas corresponding to at least two divided images, and said memory control means rewrites, when said motion image/still image mixed display mode is designated, pixel data of one field read from one of said memories to the second storage area of another one of said memories after reducing in number said pixel data by means of said reduction processing means, rewrites pixel data by means of said reduction processing means, rewrites pixel data read from said another one of said memories into said one of memories, and subsequently rewrites pixel data only to the first storage areas of said first and second memories.

4. An apparatus according to claim 3, wherein said display panel is a plasma display panel such that one field is divided into a plurality of subfields and a gradation display is performed.

* * * * *